United States Patent
Weiser

(10) Patent No.: US 12,497,046 B2
(45) Date of Patent: Dec. 16, 2025

(54) SMART TRAFFIC CONTROL DEVICES AND BEACONS, METHODS OF THEIR OPERATION, AND USE BY VEHICLES OF INFORMATION PROVIDED BY THE DEVICES AND BEACONS

(71) Applicant: Anatoly S. Weiser, San Diego, CA (US)

(72) Inventor: Anatoly S. Weiser, San Diego, CA (US)

(*) Notice: Subject to any disclaimer, the term of this patent is extended or adjusted under 35 U.S.C. 154(b) by 0 days.

(21) Appl. No.: 18/408,562

(22) Filed: Jan. 9, 2024

(65) Prior Publication Data

US 2024/0140428 A1 May 2, 2024

Related U.S. Application Data

(63) Continuation-in-part of application No. 17/061,576, filed on Oct. 1, 2020, now Pat. No. 11,866,046, which
(Continued)

(51) Int. Cl.
*B60W 30/18* (2012.01)
*G08B 5/00* (2006.01)
(Continued)

(52) U.S. Cl.
CPC ......... *B60W 30/18154* (2013.01); *G08B 5/00* (2013.01); *G08G 1/096* (2013.01);
(Continued)

(58) Field of Classification Search
CPC ....... B60W 30/18154; B60W 2556/45; B60W 2556/60; G08B 5/00; G08G 1/096; G08G 1/097; G09F 9/00
(Continued)

(56) References Cited

U.S. PATENT DOCUMENTS 6,633,238 B2 10/2003 Lemelson et al.
7,495,579 B2 2/2009 Sirota et al.
(Continued)

OTHER PUBLICATIONS

Jonathan M. Gitlin, The traffic signals in Washington, DC, can now talk to your car—if it's an Audi (Mar. 14, 2018), arstechnica.com/cars/2018/03/cars-that-talk-to- . . . all pages.
(Continued)

*Primary Examiner* — Joshua E Rodden
(74) *Attorney, Agent, or Firm* — Anatoly S. Weiser, Esq.

(57) ABSTRACT

A traffic control system implements methods for transmitting current states of a traffic control device (TCD). The traffic control system may also transmit anticipated state transition of the TCD. The traffic control systems may additionally transmit confidence level of the anticipated state change and its timing. The current state, the anticipated transition, and the confidence level are received by a vehicle computer, which may perform adjustments to vehicle power train operations in response to the received information. The adjustments may include engagement/disengagement of a braking system; engagement/disengagement of a regenerative braking system; application/release of motive power; increasing/decreasing engine/motor power; engagement/disengagement of motor/engine (through a clutch or otherwise); starting/stopping of the internal combustion engine; selection of a gear ratio in a transmission; selection of a particular electrical storage device for providing motive power or for receiving regenerated electrical power; engagement/disengagement of a compressor of a climate control system; and others.

20 Claims, 11 Drawing Sheets

Related U.S. Application Data is a continuation-in-part of application No. 17/039,885, filed on Sep. 30, 2020, now Pat. No. 11,685,376, which is a continuation of application No. 16/112,743, filed on Aug. 26, 2018, now Pat. No. 10,836,393.

(60) Provisional application No. 62/596,891, filed on Dec. 10, 2017.

(51) Int. Cl.
*G08G 1/096* (2006.01)
*G08G 1/097* (2006.01)
*G09F 9/00* (2006.01)

(52) U.S. Cl.
CPC ............... *G08G 1/097* (2013.01); *G09F 9/00* (2013.01); *B60W 2555/60* (2020.02); *B60W 2556/45* (2020.02)

(58) Field of Classification Search
USPC .......................................................... 701/2
See application file for complete search history.

(56) References Cited

U.S. PATENT DOCUMENTS

| | | | |
|---|---|---|---|
| 7,580,795 B2 | 8/2009 | McCarthy et al. | |
| 8,909,461 B2* | 12/2014 | Geissenhoener | B60K 28/12 |
| | | | 701/115 |
| 9,008,416 B2 | 4/2015 | Movellan et al. | |
| 9,449,515 B2 | 9/2016 | Rubin et al. | |
| 9,552,535 B2 | 1/2017 | Movellan et al. | |
| 9,630,626 B2 | 4/2017 | Johri et al. | |
| 9,779,289 B2 | 10/2017 | Movellan et al. | |
| 9,958,059 B2* | 5/2018 | Hu | F16H 61/0213 |
| 10,373,489 B2 | 8/2019 | Malkes et al. | |
| 10,636,298 B2 | 4/2020 | Malkes et al. | |
| 10,636,299 B2 | 4/2020 | Malkes et al. | |
| 10,699,142 B2 | 6/2020 | Wisniowski et al. | |
| 10,836,393 B2 | 11/2020 | Weiser | |
| 11,053,873 B2 | 7/2021 | Meroux et al. | |
| 11,126,874 B2 | 9/2021 | Caron et al. | |
| 11,164,453 B1 | 11/2021 | Cooper | |
| 11,685,376 B2 | 6/2023 | Weiser | |
| 11,866,046 B2 | 1/2024 | Weiser | |
| 2002/0124580 A1* | 9/2002 | Suitou | B60H 1/3222 |
| | | | 62/133 |
| 2002/0148424 A1* | 10/2002 | Wakabayashi | G08G 1/096775 |
| | | | 180/167 |
| 2008/0046165 A1 | 2/2008 | Downs et al. | |
| 2010/0070128 A1 | 3/2010 | Johnson | |
| 2010/0125402 A1 | 5/2010 | Bansal et al. | |
| 2011/0043378 A1 | 2/2011 | Bailey et al. | |
| 2013/0297124 A1 | 11/2013 | Be et al. | |
| 2014/0046509 A1 | 2/2014 | Otake | |
| 2015/0210274 A1 | 7/2015 | Clarke et al. | |
| 2015/0329107 A1 | 11/2015 | Meyer et al. | |
| 2016/0027301 A1* | 1/2016 | Publicover | G08G 1/0962 |
| | | | 340/932 |
| 2016/0174106 A1 | 6/2016 | Lee et al. | |
| 2016/0257288 A1 | 9/2016 | Miller et al. | |
| 2017/0008522 A1* | 1/2017 | Sato | B60W 60/0051 |
| 2018/0148063 A1* | 5/2018 | Tatsushiro | B60W 30/18009 |
| 2018/0257643 A1 | 9/2018 | Kroop et al. | |
| 2019/0244518 A1 | 8/2019 | Cheng et al. | |
| 2019/0248369 A1* | 8/2019 | Mizuno | B60W 50/00 |
| 2020/0012870 A1 | 1/2020 | Caron et al. | |
| 2020/0168083 A1 | 5/2020 | Vaudrin et al. | |
| 2020/0353932 A1 | 11/2020 | Wang et al. | |
| 2021/0179135 A1 | 6/2021 | Ahn | |
| 2022/0073106 A1 | 3/2022 | Ahn | |
| 2022/0101045 A1 | 3/2022 | Chen et al. | |
| 2022/0114375 A1 | 4/2022 | Chen et al. | |

OTHER PUBLICATIONS

Megan Geuss, Audi's new traffic light countdown seems basic, but it's a big step for autonomy (Dec. 9, 2016), all pages, arstechnica.com/cars/2016/12/in-las-vegas-audis-now . . .
Jonathan M. Gitlin, BMW's Enlighten app wants to take away your red light blues (Jul. 31, 2015), all pages, arstechnica.com/cars/2015/07/bmws-enlighten-app-wants-to-take-away . . .
Miura et al., New Traffic Signal Controller for Improved Fail-Safe Functions, SEI Technical Review, No. 78, Apr. 2014 all attached pages (35-38).
M. Werner, Indoor Location-Based Services Ch 3, 2014, Springer Int'l Pub. Switzerland, all attached pages (73-99).
Qiu et al., Multifrequency Phase Difference of Arrival Range Measurement: Principle, Implementation, and Evaluation, Int'l J. of Dist. Sensor Nets 2015 Art ID715307 all pages.
How does a traffic light detect that a car has pulled up and is waiting for the light to change?, HowStuffWorks, link on paper, retrieved online Aug. 26, 2018, all pages.
Wikipedia entry for Dedicated short-range communications, https://en.wikipedia.org/wiki/Dedicated_short-range_communications, retrieved online Dec. 20, 2023.
Mayor Gloria Signs Smart Streetlights, NewSafe Sidewalk Program into Law, Gloria press release dated Nov. 22, 2023, retrieved online Nov. 27, 2023.
San Diego Mayor Gloria signs into law use of Smart Streetlights, . . . , https://www.nbcsandiego.com/author/city-news-service-236/, retrieved online Nov. 27, 2023, all pages.
Liu et al., On the Unambiguous Distance of Multi-Carrier Phase Ranging with Random Hopped Frequencies, https://arxiv.org/abs/1702.05616, Feb. 18, 2017, accessed Feb. 21, 2024, all pp.
Wikipedia entry for Vehicular ad hoc network, https://en.wikipedia.org/wiki/Vehicular_ad_hoc_network, accessed Feb. 21, 2024, all pages.
Wikipedia entry for Vehicular communication systems, https://en.wikipedia.org/wiki/Vehicular_communication_systems, accessed Feb. 21, 2024, all pages.

* cited by examiner

SMART TRAFFIC CONTROL DEVICES AND BEACONS, METHODS OF THEIR OPERATION, AND USE BY VEHICLES OF INFORMATION PROVIDED BY THE DEVICES AND BEACONS

CROSS-REFERENCE TO RELATED APPLICATIONS

This application is a continuation-in-part of and claims priority to U.S. patent application Ser. No. 17/061,576, entitled SMART TRAFFIC CONTROL DEVICES AND BEACONS, METHODS OF THEIR OPERATION, AND USE BY VEHICLES OF INFORMATION PROVIDED BY THE DEVICES AND BEACONS, filed Oct. 1, 2020, to be issued as U.S. Pat. No. 11,866,046 on Jan. 9, 2023; which is a continuation-in-part of and claims priority to U.S. patent application Ser. No. 17/039,885, entitled SMART TRAFFIC CONTROL DEVICES AND BEACONS, METHODS OF THEIR OPERATION, AND USE BY VEHICLES OF INFORMATION PROVIDED BY THE DEVICES AND BEACONS, filed Sep. 30, 2020, now U.S. Pat. No. 11,685,376; which is a continuation of and claims priority to U.S. patent application Ser. No. 16/112,743, entitled SMART TRAFFIC CONTROL DEVICES AND BEACONS, METHODS OF THEIR OPERATION, AND USE BY VEHICLES OF INFORMATION PROVIDED BY THE DEVICES AND BEACONS, filed Aug. 26, 2018, now U.S. Pat. No. 10,836,393; which claims priority to U.S. Provisional Patent Application Ser. No. 62/596,891, entitled SMART TRAFFIC CONTROL DEVICES, METHODS OF THEIR OPERATION, AND USE BY VEHICLES OF INFORMATION PROVIDED BY THE DEVICES, filed Dec. 10, 2017; each of the above-referenced patent documents is hereby incorporated by reference in its entirety as if fully set forth herein, including Specification, Figures, Claims, and all other matter.

FIELD OF THE DISCLOSURE

This disclosure relates generally to the field of smart traffic control devices, beacons for distance measurement and location services, and the use of signals emanated by the smart traffic control devices and beacons. This disclosure also relates to power train management in vehicles. Selected of the disclosed examples relate to power train control of vehicles communicating with traffic control devices, including control of braking, accessory operation, and charging through regenerative braking; to speed management of vehicles communicating with traffic control devices; to vehicle position location techniques; to communications between smart traffic control devices and remote facilities; and to related vehicular and traffic control and management technologies.

BACKGROUND

A need in the art exists for improved vehicle power trains and techniques for managing vehicle power trains. A need in the art exists for improved traffic control devices and traffic control device fault diagnosing, monitoring, reporting, mitigating, and correcting. A need in the art exists for improved techniques for accurate estimation of locations of vehicles and other assets/articles. A need in the art exits for improved communications with and between automotive technology devices, including traffic control devices, beacons, roadside units ("RSU"s) in Vehicular Ad hoc Networks ("VANET"s), and smart cameras and similar street/roadside devices.

SUMMARY

This document describes embodiments, variants, implementations, and examples effectuating novel techniques for addressing one or more of the needs identified above, and/or other needs. Selected embodiments described in this document include methods, apparatus, and articles of manufacture that enable enhanced operations of smart traffic control devices, beacons, vehicle computers, vehicular power trains; and enhanced distance measurement and location estimation techniques.

In an embodiment, a traffic control device ("TCD") includes a processing module, storage, camera(s), visual traffic control display(s), radio frequency transceiver(s), interface(s) to state-affecting sensor(s), and bus(es) coupling the processing module to the storage, the camera(s), the visual traffic control display(s), the radio frequency transceiver(s), and the interface(s) to the state-affecting sensor(s). The processing module implements a state machine to control traffic, e.g., through the visual traffic control display(s). The processing module is configured to communicate with remote resource(s). The processing module and the remote resource(s) are configured to implement means for identifying false green request(s).

In an embodiment, a method of operating a traffic control device includes a number of steps. The traffic control device includes a processing module, storage, camera(s), visual traffic control display(s), radio frequency transceiver(s), interface(s) to state-affecting sensor(s), and a bus (or buses) coupling the processing module to the storage, the camera(s), the visual traffic control display(s), the radio frequency transceiver(s), and the interface(s) to the state-affecting sensor(s). The processing module is configured to communicate with a remote resource. The method steps include: operating a state machine controlling traffic, e.g., through the visual traffic control display(s); and step for identifying false green request(s).

In an embodiment, an article of manufacture includes at least one non-volatile machine-readable storage medium with program code stored in the at least one non-volatile machine-readable storage medium. When the program code is executed by (a) a processing module of a traffic control device that includes the processing module, storage, camera(s), visual traffic control display(s), radio frequency transceiver(s), interface(s) to state-affecting sensor(s); and (b) one or more processors of a remote resource, the program code configures the processing module and the one or more processors to operate a state machine controlling traffic in the vicinity of the traffic control device; and to perform steps for identifying false green requests in the traffic control device.

In an embodiment, a traffic control device includes a processing module, storage, camera(s), visual traffic control display(s), radio frequency transceiver(s), interface(s) to state-affecting sensor(s), and a bus (or buses) coupling the processing module to the storage, the camera(s), the visual traffic control display(s), the radio frequency transceiver(s), and the interface(s) to the state-affecting sensor(s). The processing module implements a state machine to control traffic. The processing module is also configured to communicate with a remote resource. The processing module and the remote resource are configured to implement means for detecting and verifying unidentified true green requests.

Another embodiment is a method of operating a traffic control device including a processing module, storage, camera(s), visual traffic control display(s), radio frequency transceiver(s), interface(s) to state-affecting sensor(s), and a bus (or buses) coupling the processing module to the storage, the camera(s), the visual traffic control display(s), the radio frequency transceiver(s), and the interface(s) to the state affecting sensor(s). The processing module is configured to communicate with a remote resource. The method includes: operating a state machine controlling traffic; and steps for detecting and verifying unidentified true green requests.

Another embodiment is an article of manufacture including at least one non-volatile machine-readable storage medium with program code stored in the at least one non-volatile machine-readable storage medium. When the program code is executed by (a) a processing module of a traffic control device that includes the processing module, storage, camera(s), visual traffic control display(s), radio frequency transceiver(s), interface(s) to state-affecting sensor(s), and by (b) one or more processors of a remote resource, the program code configures the processing module and the one or more processors to operate a state machine controlling traffic in the vicinity of the traffic control device, and to perform step for detecting and verifying unidentified true green requests in the traffic control device.

In an embodiment, a traffic control device includes a processing module, storage, camera(s), visual traffic control display(s), radio frequency transceiver(s), interface(s) to state-affecting sensor(s), and a bus or buses coupling the processing module to the storage, the camera(s), the visual traffic control display(s), the radio frequency transceiver(s), and the interface(s) to the state-affecting sensor(s). The processing module implements a state machine to control traffic. The processing module is configured to cause the traffic control device to implement means for communicating with a remote resource through vehicles passing in the vicinity of the traffic control device.

Another embodiment is a method of operating a traffic control device including a processing module, storage, camera(s), visual traffic control display(s), radio frequency transceiver(s), interface(s) to state-affecting sensor(s), and a bus or buses coupling the processing module to the storage, the camera(s), the visual traffic control display(s), the radio frequency transceiver(s), and the interface(s) to the state-affecting sensor(s). The method includes operating a state machine controlling traffic; and step for communicating with a remote resource through vehicles passing in the vicinity of the traffic control device.

Another embodiment is an article of manufacture including at least one non-volatile machine-readable storage medium with program code stored in the at least one non-volatile machine-readable storage medium. When the program code is executed by (a) a processing module of a traffic control device including a processing module, storage, camera(s), visual traffic control display(s), radio frequency transceiver(s), interface(s) to state-affecting sensor(s), and a bus or buses coupling the processing module to the storage, the camera(s), the visual traffic control display(s), the radio frequency transceiver(s), and the interface(s) to the state-affecting sensor(s), and by (b) one or more processors of a remote resource, the program code configures the traffic control device and the remote resource to operate a state machine controlling traffic in the vicinity of the traffic control device; and to perform step for communicating between the traffic control device and the remote resource through vehicles passing in the vicinity of the traffic control device.

In an embodiment, a traffic control device includes a processing module, storage, camera(s), visual traffic control display(s), radio frequency transceiver(s), interface(s) to state-affecting sensor(s), and a bus or buses coupling the processing module to the storage, the camera(s), the visual traffic control display(s), the radio frequency transceiver(s), and the interface(s) to the state-affecting sensor(s). The processing module implements a state machine to control traffic in the vicinity of the traffic control device. The processing module is configured to cause the traffic control device to implement means for enabling vehicles and other devices in the vicinity of the traffic control device to estimate distance to the traffic control device by measuring phase shifts of at least three frequencies emitted by the traffic control device.

Another embodiment is a method of operating a traffic control device including a processing module, storage, camera(s), visual traffic control display(s), radio frequency transceiver(s), interface(s) to state-affecting sensor(s), and a bus or buses coupling the processing module to the storage, the camera(s), the visual traffic control display(s), the radio frequency transceiver(s), and the interface(s) to the state-affecting sensor(s). The method includes operating a state machine to control traffic in the vicinity of the traffic control device; and step for enabling vehicles and other devices in the vicinity of the traffic control device to estimate distance to the traffic control device by measuring phase shifts of at least three frequencies emitted by the traffic control device.

Another embodiment is an article of manufacture including at least one non-volatile machine-readable storage medium with program code stored in the at least one non-volatile machine-readable storage medium. When the program code is executed by a processing module of a traffic control device including the processing module, storage, camera(s), visual traffic control display(s), radio frequency transceiver(s), interface(s) to state-affecting sensor(s), and a bus or buses coupling the processing module to the storage, the camera(s), the visual traffic control display(s), the radio frequency transceiver(s), and the interface(s) to the state-affecting sensor(s), the program code configures the traffic control device to perform steps including: operating a state machine to control traffic in the vicinity of the traffic control device; and step for enabling vehicles and other devices in the vicinity of the traffic control device to estimate distance to the traffic control device by measuring phase shifts of at least three frequencies emitted by the traffic control device.

In an embodiment, a traffic control device includes a processing module, storage, camera(s), visual traffic control display(s), radio frequency transceiver(s), interface(s) to state-affecting sensor(s), and a bus or buses coupling the processing module to the storage, the camera(s), the visual traffic control display(s), the radio frequency transceiver(s), and the interface(s) to the state-affecting sensor(s). The processing module implements a state machine to control traffic in the vicinity of the traffic control device. The processing module is configured to cause the traffic control device to transmit in real time state(s) of the traffic control device in one or more directions of traffic movement controlled by the traffic control device. In variants, the processing module is further configured to cause the traffic control device to transmit in real time wait times to changes in the states. In variants, the processing module is configured to cause the traffic control device to transmit in real time indications of likelihood of the wait times to the changes in the states.

In an embodiment, a method of operating a traffic control device including a processing module, storage, camera(s), visual traffic control display(s), radio frequency transceiver(s), interface(s) to state-affecting sensor(s), and a bus or buses coupling the processing module to the storage, the camera(s), the visual traffic control display(s), the radio frequency transceiver(s), and the interface(s) to the state-affecting sensor(s) includes the following steps: implementing a state machine to control traffic in the vicinity of the traffic control device; and transmitting in real time state(s) of the traffic control device in one or more directions of traffic movement controlled by the traffic control device. In variants, the method further includes transmitting, in real time, wait times to changes in the states. In variants, the method further includes transmitting, in real time, indications of likelihood of the wait times to the changes in the states.

Another embodiment is an article of manufacture including at least one non-volatile machine-readable storage medium with program code stored in the at least one non-volatile machine-readable storage medium. When the program code is executed by a processing module of a traffic control device that includes the processing module, storage, camera(s), visual traffic control display(s), radio frequency transceiver(s), interface(s) to state-affecting sensor(s), and a bus coupling the processing module to the storage, the camera(s), the visual traffic control display(s), the radio frequency transceiver(s), and the interface(s) to the state-affecting sensor(s), the program code configures the traffic control device to: (a) implement a state machine to control traffic in vicinity of the traffic control device; and (b) transmit in real time states of the traffic control device in one or more directions of traffic movement controlled by the traffic control device. In variants, the program code further configures the traffic control device to transmit, in real time, wait times to changes in the states. In variants, the program code further configures the traffic control device to transmit, in real time, indications of likelihood of the wait times to the changes in the states.

In an embodiment, a traffic control device includes: a processing module, storage, one or more cameras, one or more visual traffic control displays, one or more interfaces to state-affecting sensors, one or more remote interfaces to one or more remote computer systems, and one or more buses coupling the processing module to the storage, the one or more cameras, the one or more visual traffic control displays, the one or more interfaces to the state-affecting sensors, and the one or more remote interfaces.

The processing module is configured to: implement a state machine to control traffic through the one or more visual traffic control displays; obtain a preliminary false green request (FGR) detection; identify one or more locations that correspond to the preliminary FGR detection; obtain through the one or more cameras one or more recordings of the one or more locations, the one or more recordings corresponding to time a green request (GR) associated with the preliminary FGR detection was generated (first generated and/or continued to be generated); perform first machine-processing of GR-related data that includes the one or more recordings, to attempt to determine whether the preliminary FGR detection corresponds to a real GR; if the first machine-processing indicates that the preliminary FGR detection resulted from the real GR, clear the preliminary FGR detection (and resume or continue normal operation); if the first machine-processing does not indicate that the preliminary FGR detection resulted from the real GR, transmit through the one or more remote interfaces to the one or more remote computer systems information regarding events that caused the preliminary FGR detection, the information including at least some of the GR-related data, the at least some of the GR-related data including the one or more recordings; and clear the preliminary FGR detection (and resume or continue normal operation of the state machine), in response to receipt by the TCD of a clear signal from the one or more remote computer systems.

The one or more remote computer systems are configured to receive the information from the TCD; perform additional processing of the information to attempt to determine whether the preliminary FGR detection corresponds to the real GR or an FGR; and, if the additional processing indicates the preliminary FGR detection resulted from the real GR, transmit the clear signal to the TCD to cause the TCD to clear the preliminary FGR detection.

In an embodiment, a method of diagnosing of a computer-based traffic control system includes recording one or more images of at least one visual traffic control display (VTCD) of a traffic control device (TCD) of the computer-based traffic control system during a diagnostic period, by the computer-based traffic control system; obtaining (e.g., recording, registering, otherwise making available for concurrent and/or later comparison) one or more expected states of the TCD during the diagnostic period, by the computer-based traffic control system; processing the one or more images to identify one or more actual VTCD states during the diagnostic period, by the computer-based traffic control system; comparing the one or more actual VTCD states with the one or more expected states to determine whether a mismatch exists between contemporaneous actual and expected states, by the computer-based traffic control system; and performing a corrective action in response to the mismatch, by the computer-based traffic control system. The step of recording the one or more images is performed by a camera external to the TCD.

In an embodiment, a method of diagnosing traffic control systems includes recording one or more images of a visual traffic control display (VTCD) of a traffic control device (TCD) of a computer-based traffic control system, during a diagnostic period; obtaining one or more expected states of the VTCD during the diagnostic period; processing the one or more images to identify one or more actual VTCD states during the diagnostic period, by the computer-based traffic control system; and comparing the one or more actual VTCD states with the one or more expected states to determine whether a mismatch exists between the actual states of the VTCD and the expected states of the VTCD that are contemporaneous with the actual states of the VTCD. The step of recording is performed by a camera external to the TCD. The camera may be part of a camera-equipped device external to the TCD. The method may include operating a state machine of the TCD to control traffic through one or more visual traffic control displays of the TCD, the one or more visual traffic control displays comprising the VTCD.

In an embodiment, a traffic control device (TCD) includes a processing module, storage, a visual traffic control display (VTCD), one or more interfaces to one or more remote computer systems and to a camera-equipped device external to the TCD, and one or more connections coupling the processing module to the storage, the VTCD, the one or more interfaces, and the one or more remote interfaces, wherein the processing module is configured to: acquire one or more images of the VTCD during a diagnostic period, from the camera-equipped device external to the TCD; obtain one or more expected states of the VTCD during the diagnostic period; process the one or more images to identify one or more actual VTCD states of the VTCD during the diagnostic period; and compare the one or more actual VTCD states of the VTCD with the one or more expected states of the VTCD to determine whether a mismatch exists between contemporaneous actual and expected states of the VTCD.

Various features and aspects will be better understood with reference to the following description, drawings, and appended claims.

DETAILED DESCRIPTION

Figure 1:
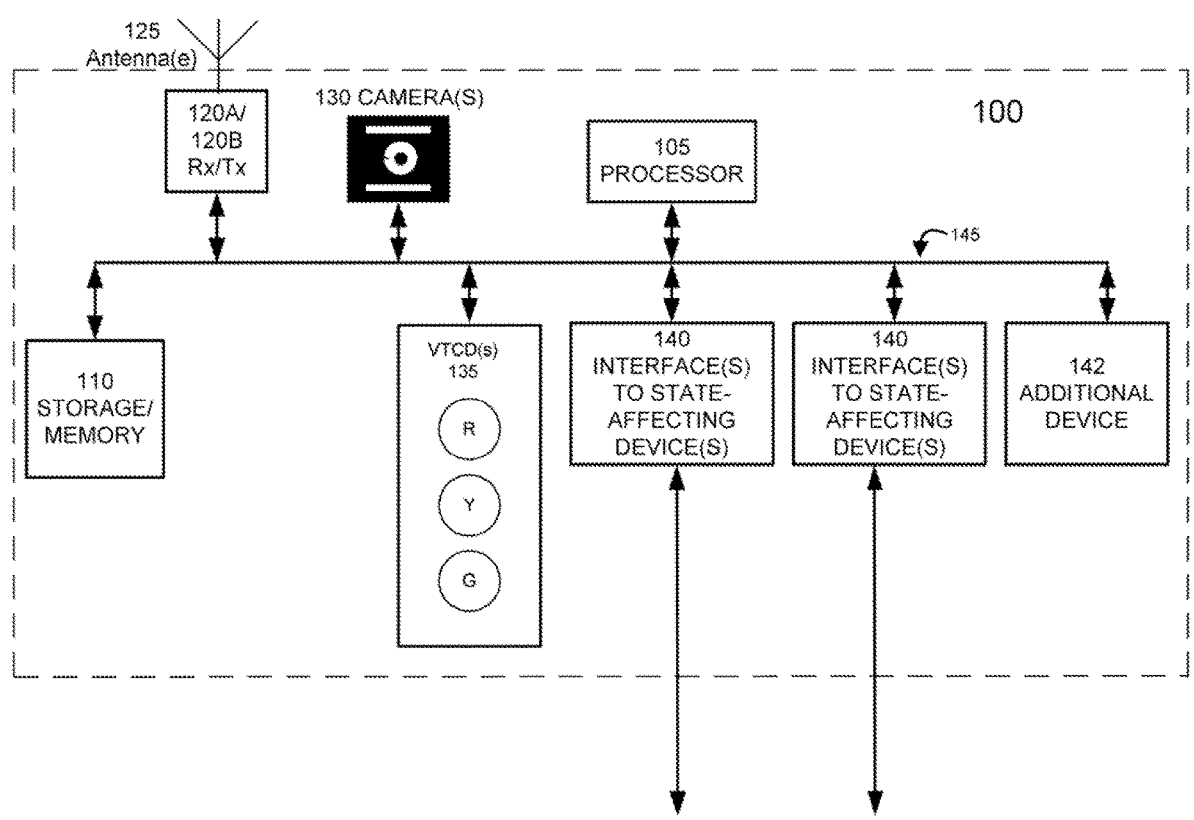
FIG. 1 illustrates selected components of a traffic control device configured in accordance with selected features described in this document.

The words "embodiment," "variant," "example," "implementation," and similar words and expressions as used in this document refer to a particular apparatus, process, article of manufacture, or part of apparatus/process/article of manufacture, and not necessarily to the same apparatus, process, article of manufacture, or part thereof. Thus, "one embodiment" (or a similar word/expression) used in one place or context may refer to a particular apparatus, process, article of manufacture, or part thereof; the same or a similar expression in a different place or context may refer to a different apparatus, process, article of manufacture, or part thereof. The expression "alternative embodiment" and similar words and phrases are used to indicate one of a number of different possible embodiments, variants, examples, or implementations. The number of possible embodiments, variants, examples, or implementations is not necessarily limited to two or any other quantity. Characterization of an item as "exemplary" or listing an item following "for example," "for instance," or similar expressions means that the item is used for illustration. Such characterization does not necessarily mean that the embodiment, variant, example, implementation, or part thereof is a preferred one; the embodiment, variant, implementation, example, or part thereof may but need not be a currently-preferred embodiment, variant, implementation, example, or part thereof. All embodiments, variants, implementations, and examples are described for illustration purposes and are not necessarily strictly limiting.

The words "couple," "connect," and similar words/phrases/expressions with their inflectional morphemes do not necessarily import an immediate or direct connection, but include within their meaning connections through mediate elements. Unless otherwise noted or is clear from the context, devices may be coupled/connected wirelessly, optically, and in a conventional wired manner Connections may include buses and various network(s), including local area networks (LANs) and wide area networks (WANs) such as the Internet.

"Red," "green," and "yellow" have their conventional meaning in the context of traffic control devices (traffic lights etc.). Note that "yellow" in this context may actually be amber, and "green" may be turquoise.

The expression "processing logic" should be understood as selected steps/decision blocks and/or hardware/software/firmware for implementing the selected steps/decision blocks. "Decision block" means a step in which a decision is made based on some condition, and subsequent process flow is directed based on whether the condition is met or not met.

A camera of a camera-equipped device is "external" to a particular traffic control device in the sense that it is at such a distance from the traffic control device that it can monitor visually the state of a display of the traffic control device; the camera-equipped device with such external camera may be referred to as an "external camera-equipped device" relative to the traffic control device. Typically, an external camera is >25 feet/7.62 meters away from the display, but within 1000 feet/304.8 meters of the traffic control device. Also typically, the camera is outside of the enclosure of the traffic control device which it monitors. The TCD's enclosure, however, may be extended to receive the camera installation, in which case such enclosure extension would typically extend six or more feet (1.83 meters, and preferably more than ten feet or 3.048 meters) away from the monitored visual traffic control display of the TCD.

A camera of a camera-equipped device is a "nearby camera" and the device is a "nearby device" relative to a particular traffic control device if it is not part of the traffic control device, it is placed so that it has a view of the locations from which green requests directed to the traffic control device are expected to be generated in the course of normal operation of the traffic control device. Green requests are explained below. A location from which a pedestrian pushbutton of the traffic control device can be activated, for example, is a location from which green requests directed to the traffic control device are expected to be generated. As another example, a location within the sensory range of an inductive loop traffic sensor (or another type of vehicle sensor) of the traffic control device is such location as well. It may be, for example, an RSU camera, a beacon camera, a camera of another TCD in the area, a camera installed in a vehicle passing through or near the intersection controlled by the TCD 100, a camera in a "mobile device" of a pedestrian nearby (e.g., in the vicinity), a camera of a mobile device of a person in a vehicle passing through or near (e.g., in the vicinity of) the intersection, a stand-alone camera with communication capability such as a street light camera.

A "mobile device" equipped with a camera or a "camera-equipped" "mobile device" is a portable camera-equipped electronic device that can ordinarily be carried by a person. Examples of such mobile devices include smartphones, tablets, mobile PCs, portable navigation devices, portable gaming devices, smart watches, and smart glasses.

Two or more directions controlled by a traffic control device are "conflicting" when the traffic control device may not safely allow traffic, whether pedestrian or vehicular, to flow in the two or more directions at the same time. Suppose, for example, that the traffic control device controls a four-way intersection (no overpasses) with North-to-South, South-to-North, East-to-West, and West-to-East traffic flows. The North-to-South vehicular traffic flow need not conflict with the South-to-North traffic flow, but will conflict with both East-to-West and West-to-East traffic flows. Additionally, the North-to-South vehicular traffic flow may conflict with vehicular traffic approaching from South and waiting to make a left turn towards West; and with pedestrian traffic waiting to cross the North-South roadway. These are of course merely examples, and conflict between and among different directions may be programmed differently, for example, showing a red "DO NOT CROSS" or "DO NOT WALK" or "STOP" display to prohibit pedestrians from crossing in any direction when any vehicular traffic is allowed (by a green light, for example) through the intersection in any direction. Similarly, right turn may be allowed (perhaps after a stop) from a lane that may not cross the intersection. It is a matter of design of the intersection and choice of operating procedures programmed into the state machine of the traffic control device, which, of course, should not be nonsensical in the real world.

The expression "finite-state machine" (or simply "state machine") in this document has its ordinary meaning in the art. A state machine is defined by a finite number of states and rules-based transitions between/among the states in response to the passage of time and/or in response to external stimuli. A state is the status of a system (generally, a traffic control device in this document) that is waiting to execute a transition. A transition is one or more actions of the system executed when a condition is fulfilled and/or when an event is received. In a traffic control device, an action may correspond to one or more displays illuminated or darkened or caused to blink, for example. Moreover, in a traffic control device an action may be beginning of a countdown (waiting period) to another action or transition, which other action/transition may be a change in one or more displays. "Operating a state machine" of a traffic control device generally means executing the transitions between the states of the traffic control device.

A "green request" or "GR" is a signal informing a traffic control device that some entity (e.g., a pedestrian, a vehicle) needs to proceed in a particular direction (and consequently to prevent flow of traffic in the conflicting direction(s)). For example, detection of a vehicle in a particular lane is a GR to proceed in a particular direction that is associated with the lane, such as proceed forward, proceed with a left turn, or proceed with a right turn. As another example, activation of (pressure on) a pedestrian crossing pushbutton is a GR to change the state of a pedestrian control display to WALK (or equivalent/analogous display) in the direction associated with the pushbutton, i.e., the direction in which the pedestrian signals that the pedestrian wishes to proceed/cross (and consequently to prevent vehicular traffic flow across the pedestrian walkway that is associated with the pushbutton. An unambiguous GR indicates traffic (whether vehicular or pedestrian) proceeding or waiting to proceed in a particular direction. An inductive loop signal indicating a vehicle in a center lane of an intersection where turns from the center lane are prohibited is an unambiguous GR; an inductive loop signal indicating a vehicle in a right (or left) lane of an intersection where turns from the right (or left) lane are allowed but not required is an ambiguous GR, because the vehicle may proceed forward or turn; an inductive loop signal indicating a vehicle in a center lane of an intersection where right turns from the center lane are allowed but not required is also an ambiguous GR; receipt of an emergency preemption signals may be ambiguous or unambiguous, depending on the details (whether or not a particular direction is indicated) provided by such signals and the treatment of such signals by the TCD. Often, however, an emergency preemption signal is an unambiguous green request, telling the traffic control device to disallow traffic in all directions; no green light need be associated with an emergency preemption signal, because emergency traffic with a siren may be able to proceed lawfully against a red light.

A malfunction causing a continuous (or periodic, or even merely occasional) reporting of a request for a permission to proceed in a given direction without actual traffic (whether vehicular or pedestrian) causing the request is a "false green request" or "false GR" or "FGR." Examples of false green requests include: a stuck pushbutton of a pedestrian crossing and an inductive loop sensor malfunction that produces an unwarranted vehicle detected signal (such as a continuous or an intermittent vehicle detected signal). A proper vehicle detected signal due to a vehicle that stays near an inductive loop for a prolonged time (such as an illegally parked vehicle, broken down vehicle, maintenance vehicle for work in the immediate vicinity of the TCD, etc.) is also an FGR cause, though the "malfunction" here exists in the sense of an irregular condition that appears to indicate a need for some corrective action. Other examples include emergency preemption request signals (as explained above) sent from malfunctioning or maliciously operated emergency vehicle operator devices or from other devices that create interference mistaken by the TCD for emergency preemption request signals, and otherwise improperly arisen/detected emergency preemption signals.

Thus, false green requests may be generated by a temporary condition which is expected to clear by itself and is not caused by a malfunction of the TCD and its sensors, such as an improperly parked or a disabled vehicle, or a maintenance work vehicle parked in a traffic lane; such false green requests are "soft." False green requests may also be generated by a device malfunction that is not expected to clear by itself, at least not within a reasonable or foreseeable time, such as a malfunction of a sensor (e.g., pushbutton, inductive loop), malfunction in the TCD itself (e.g., bad operation of one of the interfaces to external devices/sensors or other hardware/software failures of the TCD). Such false green requests are "hard." Additionally, false green requests may also be of unknown origin or otherwise not being easily susceptible to classification as to the ability to clear by themselves within a reasonable time (e.g., under one, two, three, four, five days, or even several weeks or months). These include radio interference, including malfunctions in, or abuse of, emergency preemption request signal-generating devices. Such false green requests are "unknown" false green requests.

A false green request may be re-classified based on changing circumstances. For example, a stuck pushbutton may become unstuck and the false green request may clear. Similarly, radio interference may disappear or abate, and the initially-resulting unknown false green request may then also clear. As another example, an abandoned vehicle may initially result in a soft false green request, but after a predetermined period of time may be re-classified as either unknown or hard false green request.

Another type of malfunction causes a legitimate request for a permission to proceed in a given direction (a "true green request" or "TGR") not to be reported to the TCD. For example, a pushbutton or an inductive loop malfunction can result in a TGR that is not reported to the TCD or otherwise not detected by the processing module (which may also operate the state machine) of the TCD. Such TGR may be referred to as "undetected TGR" or "UTGR." Another example of a UTGR cause is a malfunction in an interface of the TCD to external sensors, such as interfaces to pedestrian pushbuttons and inductive loops.

"Vicinity of a traffic control device" and analogous expressions signify the area within which the traffic control device controls traffic. Roadway and pedestrian walkways within 25 meters of a TCD and leading to or away from the TCD may be considered to be in the vicinity of the TCD. In the contexts of (a) transmitting traffic signal state information and expected change in the state, and (b) distance measurement, the "vicinity" includes areas within reach of short and medium range communications of TCD transceivers (such as transceivers 120A/B described below).

In a number of places, this disclosure may refer to "video" and "still" images. Video and still images may be in the visible portion of the electromagnetic spectrum, infrared portion of the spectrum, ultraviolet portion of the spectrum, or any combination thereof, whether or not specifically mentioned in the context. Of course, the description and claims may specifically refer to a particular part or parts of the spectrum, and in the context of such references, the images are in the specific part or parts of the spectrum. Single form "image" and plural "images" are used interchangeably.

A server or a facility or a computer system (of one or more computers) that is "remote" to another item (such as a TCD/beacon) is distant from the item in the physical sense. The remote server/facility/computer system is not collocated with the item, as in the same enclosure or building. Typically, "remote" indicates a distance of one km (0.6 mile) or more, and may be 16 or more kms (10 miles), possibly more than 160 kms (100 miles) and even more than 1600 kms (1000 miles). In the case of a TCD being remote from a computer system of several computers, at least one (but not necessarily all) of these computers is remote to the TCD in the sense explained above in this paragraph; further, some or all of the computers of the system may also be remote from each other in the same sense. The computers may be networked, for example, using local or wide area networks. The computer(s) may also be connected via one or more networks to the TCD or another device from which it/they is/are remote. As will be made clear, a remote server/facility/computer system may include (or have access to) processing resources additional to, and/or of a character different from, the resources of the item. The additional processing resources may include human resources, which may be crowdsourced resources; the computer system may have an interface to such human/crowdsourced resources, and be configured to engage automatically such human/crowdsourced resources. While the interface to the human resources may form part of the remote server/facility/computer system, the human resources are not part of the remote server/facility/system.

The acronym "ICE" means internal combustion engine.

The acronym "SDV" means self-driving vehicle.

Some definitions and clarifications have been explicitly provided above. Other and further explicit and implicit definitions and clarifications of definitions may be found throughout this document and the incorporated patent documents. Still other definitions, explicit and/or implicit, may be found in one or more of the RELATED APPLICATIONs identified above and incorporated by reference herein; the definitions from the RELATED APPLICATIONs are effective in this document as well, unless the relevant concept is redefined in this document.

FIG. 1 illustrates selected components of a traffic control device or TCD 100 that may be configured in accordance with one or more features described in this document. The TCD 100 may be, for example, a traffic light. The TCD 100 includes a processing module 105. The TCD 100 also includes storage device(s) 110 (which may store program code for execution by the processing module 105, other program code, various data mentioned in this document, scratchpad data, as well as other data and code). The TCD 100 additionally includes one or more radio frequency (RF) receivers 120A and transmitters 120B. The RF receivers 120A may be configured to receive radio frequency signals; the RF transmitters 120B may be configured to transmit radio frequency signals; each RF receiver 120A and/or transmitter 120B may include its own processing module in addition to the processing module 105, and be controlled by its own processing module and/or by the processing module 105. The TCD 100 further includes one or more RF transmit and receive antennae 125 coupled to the receivers/transmitters 120A/120B; in embodiments, there is a single antenna that serves both to receive and transmit RF signals; in embodiments, there are several receive and transmit antennae. The TCD 100 further includes still and/or video camera(s) 130. The TCD 100 further includes one or more visual traffic control displays ("VTCD"s) 135. The TCD 100 further includes one or more interfaces 140 to state-affecting sensors, i.e., sensors that may affect the state of the TCD 100. The TCD 100 further includes one or more buses 145 that couple(s) the processing module 105 to some or all of the other components of the TCD 100, allowing the processing module 105 to read from and write to these devices, and/or otherwise to control operation of some or all of these devices. In embodiments, one or more additional buses interconnect the components (other than the processing module 105) directly, for example, for direct memory access of one of the other devices by another device of the TCD 100. In embodiments, some or all of the components of the TCD are connected to the processing module without a conventional bus, for example, by direct connections. In embodiments, the components are interconnected by direct connections.

In embodiments, the TCD 100 includes additional components, such as an additional device 142, which components may be coupled to the processing module 105 through the bus(es) 145 or otherwise. The TCD 100 may also (or instead of the receiver/transmitter 120A/120B and antennae 125) include infrared and/or ultrasound receiver(s)/transmitter(s) coupled to the bus(es) 145 and antenna(e) appropriate to their signals (infrared/ultrasound); the infrared/ultrasound devices may be configured to perform the functions of RF devices described throughout this document, and may include features analogous to those of the RF devices described throughout this document.

The processing module 105 may include, for example, one or more processors, such as microprocessors, dedicated processors, microcontrollers, and field-programmable devices (field-programmable gate arrays and similar field-configurable devices), and their supporting circuitry, such as DRAMs and other memories, with their memory controllers.

The storage device(s) 110 may include one or more Read Only Memories (ROMs), one or more Electrically Programmable ROMs (EPROMs), one or more Electrically Erasable Programmable ROMs (EEPROMs), magnetic storage devices (e.g., hard disk(s)), optical storage devices (e.g., CD-ROMs, DVD-ROMs), flash memories, and other forms of volatile and non-volatile storage media. Non-volatile storage media may include volatile memory with battery back-up.

The RF receivers 120A and transmitters 120B may include cellular radio receivers and transmitters that enable the TCD 100 to communicate with other devices such as cellular networks and through them with smart cell phones, smart watches, smart glasses, tablets, gaming devices, navigation devices, and applications (apps) running on the cell phones/tablets/watches/glasses/gaming devices/navigation devices, the Internet, and other Internet-connected devices. The RF receivers 120A and transmitters 120B may include long-range RF receivers and transmitters that can communicate with other TCDs/RSUs, vehicle computers in vehicles, smart phones, tablets, smart watches/glasses, gaming devices, dedicated navigation devices, other mobile devices and apps running on these devices, over distances up to and over 100 meters. The RF receivers 120A and transmitters 120B may include medium range and short range RF receivers and transmitters that can communicate with vehicle computers in vehicles, smart phones, tablets, smart watches/glasses, gaming devices, dedicated navigation devices, other mobile devices, and other devices in distances up to about 100 meters in normal operation. The RF receivers 120A and transmitters 120B may include Bluetooth® devices and other devices with the same or substantially same range. The RF receivers 120A and transmitters 120B may include Dedicated Short-Range Communications (DSRC) receivers and transmitters, such as DSRC receivers/transmitters operating according to U.S., Japanese, and European standards. Wikipedia page describing "Dedicated_short-range_communications" (accessed 12/20/2023) is filed in an information disclosure statement together or substantially together with the present Application, and is incorporated by reference as if fully set forth herein. One or more of the RF transmitters 120B may also emit beacon signals, which may but need not additionally carry payload information and location information such as coordinates of the TCD and TCD state information and time-to-change-of-state information, and serve for location and distance measurement of devices such as vehicles, mobile devices, and devices designed for distance measurement/location services.

The RF antennae 125 (and infrared/ultrasound antennae if present) may be omnidirectional and substantially omnidirectional, horizontally-omnidirectional and substantially horizontally-omnidirectional; the antennae may also be directional, including directional in three dimensions and/or directional in the horizontal plane (transmitting in a predetermined or adjustable azimuthal/compass direction over a range of altitude/elevation angles). The antennae may be steerable electronically and/or mechanically in three dimensions and/or in the horizontal plane. The antennae may include one or more antennae for operation on various frequencies. A single antenna may be used for receiving and/or transmitting on the same frequency, on multiple frequencies, and over a range of frequencies.

The one or more cameras 130 may capture still pictures and videos, in the visible light, infrared portions of the spectrum, and/or ultraviolet portions of the spectrum. The cameras 130 may be stereoscopic. The camera(s) 130 may be wide-angle, e.g., with over 90 degrees of horizontal coverage. In embodiments, the cameras 130 face different directions; their horizontal coverage may overlap, and may extend horizontally 360 degrees. In embodiments, the camera(s) 130 may be configured to determine distances from the TCD 100 to various objects, including distances to stationary objects such as vehicles; this may be done as is known in the art of photographic and video imaging and focusing. The cameras 130 may include foveated vision/imaging capabilities.

The visual traffic control display or displays 135 may include conventional red-yellow-green ("RYG") traffic lights and symbols facing one or multiple directions. The VTCD(s) 135 may include directional arrows in various colors (e.g., RYG), for controlling turning traffic, and various graphic and alphanumeric indicators, such as "STOP," "WALK," "DO NOT WALK," an image of a palm facing forward with splayed fingers, and digits such as for counting down time to change of states, in various colors, for pedestrians and/or drivers, which arrows and/or symbols may face one or multiple directions. The VTCD(s) 135 may be intended to control vehicular traffic, pedestrian traffic, and both vehicular and pedestrian traffic.

The interfaces 140 may include inputs for receiving signals from external devices that affect the state of the TCD 100 as the state relates to immediate or future changes of the display signals produced by the VTCD(s) 135 under control of the processing module 105. (Or, more precisely, potentially affect the state of the TCD 100, depending on the state of the TCD 100 and the inputs from the external devices.) The inputs may read/sense the states of a number (one or more) of inductive loop traffic detectors, for example, inductive loop traffic detectors buried under the roadway surface; pedestrian crossing pushbutton(s) and analogously-purposed devices such as devices designed to receive pedestrian traffic requests from smart phones and other mobile devices including devices built into wheelchairs, whether directly through short range RF and other transmissions, by way of a cellular service, and/or otherwise; inputs from traffic signal interruption device signals, for example, signals from emergency vehicle operator devices designed to interrupt regular operation of traffic control devices (including the TCD 100) and give priority to the emergency vehicles ("emergency preemption signals," which have already been mentioned); traffic sensing radar and/or other traffic sensing RF devices, whether active or passive; traffic sensing lidar and/or other traffic sensing active devices operating in the visible, infrared, and/or ultraviolet portions of the electromagnetic spectrum; traffic sensing sonar operating in the audible range, infrasound range, and ultrasound range of frequencies; passive optical traffic sensing devices, such as cameras with image processing capability (which capability may be provided by built-in processors, separate processors, and/or the processing module 105); passive audio/infrasound/ultrasound traffic sensing devices; and inputs from other devices that may affect the state of the TCD 100 immediately or in the near future, such as within 30 seconds, within 1 minute, within 2 minutes, within 3 minutes, within 4 minutes, and within 5 minutes. The nature of each interface 140 depends on its corresponding sensor. For example, an input may be simply a wire or a pair of wires that may convey information through the voltage on the wire or across the pair, or resistance between the wire inputs, or otherwise. The voltage may be controlled, e.g., by a pedestrian crossing pushbutton; by an inductive loop; by a self-contained sensor of the type mentioned above or another type; or otherwise. Additionally or instead, the interfaces 140 may provide for receiving (or exchanging) data that is not simply binary on-off. For example, a radar/lidar/photo appearance/signature or image may be received through one or more of the interfaces 140 for processing by the processing module 105 or otherwise; similarly, various digital signals may be received through the interfaces 140, such as Universal Serial Bus-compatible signals.

It should be noted that signals affecting the state of the TCD 100 may also or instead be received from other components of the TCD 100, including those described above. Thus, emergency preemption signals may be received, for example, through the RF receiver(s) 120A. Similarly, photo/video data may be received from the camera(s) 130. Again, these are non-exclusive examples.

The bus(es) 145 may be of any design, including conventional serial and parallel bus designs for internal computer communications. Additionally, in the present context, "bus"/"buses"/"buss"/"busses" also designate direct connections between and among devices (components of the TCD 100) to allow unidirectional or multi-directional (two or more) flow of information and control and other signals between and/or among the devices. These connections may be, for example, electrically wired, optical, or wireless.

The operation of the VTCD(s) 135 may be controlled by a state machine, for example, a state machine implemented by code executed by the processing module 105. A person skilled in the art would understand after careful perusal of this document and the incorporated patent documents that the states (and their corresponding displays on the VTCD(s) 135) and state transitions may be affected by the signals/information received through the interfaces 140, the RF receivers 120A, the camera(s) 130, internal timer(s)/clock(s), and possibly other internal/external devices.

As has already been discussed in the context of defining FGRs, the sources of the state-affecting signals may malfunction or otherwise send corrupted signals (or fail to send correct signals) to the processor module 105, for example, through the interfaces 140. For example, a pushbutton of a pedestrian crossing may be stuck in the pushed-in or out position; an inductive loop may constantly produce a signal corresponding to a vehicle awaiting a light change, regardless of the presence of such vehicles; signal corruption in this sense may also result from a vehicle that is on top or near (within sensing distance of) the inductive loop, perhaps, for example, because the vehicle broke down, is illegally parked, or is an emergency/maintenance vehicle stopped in a traffic lane. The corrupted signals received by the processing module 105 can cause the state machine to operate so that the flow of traffic at the intersection is deleteriously affected. For example, the TCD 100 may lengthen green light in one direction in response to the corrupt signal erroneously indicating that there are cars still flowing in this direction; the traffic (vehicular/pedestrian/both) flow in one or more conflicting directions may then be deleteriously affected.

In embodiments, the processing module 105 of the TCD 100 executes code to detect corruption of the state-affecting signals/information received through the interfaces 140 or otherwise. Upon detection of the corruption of the state-affecting signals/information, the processing module 105 may execute code to adjust the operation of the TCD 100 to reduce or eliminate (mitigate) the deleterious effect of the corruption; the processing module may also or instead execute code to report a malfunction, for example, report the malfunction to a proper authority, or for additional processing/verification/evaluation at one or more remote facilities. The additional processing/verification/evaluation may include the use of human resources, including crowdsourced resources and persons outside of the jurisdiction (state, country) where the TCD 100 is located. In embodiments, the processing module 105 and one or more processors execute code to diagnose the corruption of the state-affecting signals/information and/or other malfunctions involving the operation of the TCD 100, and to mitigate and/or correct the malfunctions.

There are several ways to detect FGRs and UTGRs. In examples, the process of detecting FGRs and UTGRs may be broken into two parts: (1) preliminary detection, and (2) verification (confirmation/disconfirmation). Preliminary detection may be performed by comparing recent state changes (including the absence of state changes) of a given green request signal. For example, if a particular GR has been continuously signaling for over a predetermined period of time, a preliminary detection of an FGR may be made. Similarly, if a particular GR has not been detected for a predetermined period, a preliminary detection of a UTGR may be made. The lengths of the predetermined periods (for FGR and/or UTGR preliminary detection) may vary as function(s) of various variables, including time of the day, day of the week, and calendar date. In particular, the following day/date and time attributes ("calendar attributes" and "time attribute") may affect the lengths of the predetermined periods: whether it is a work/business day, a weekend day, a school day, a holiday (federal, state, religious), significant traffic-affecting event day in general or within a predetermined distance (e.g., a local fair or farmers' market, a parade, a presidential/dignitary visit) within a predetermined distance of such as 1.6/3.2/4.8 kms or one/two/three miles) of the TCD, day time, night time, rush hours or business hours (such as 9 am-6 pm). The length of the predetermined period may be initially set to some default value and then varied based on the statistics of actual traffic and GRs detected at the TCD or at other TCDs in a larger area such as within a predetermined distance (e.g., within one, three, five, ten miles) of the TCD or in the same zip code as the TCD. Additionally, a preliminary detection of an FGR may be made when the particular GR is not continuously signaling but nevertheless is signaling for a percentage of time that is much greater (e.g., more by a factor of $\geq 2$, $\geq 3$, $\geq 10$) than would be statistically expected based on the other factors (e.g., day/date/time etc., as has already been described in this paragraph). Multifactor, regression, principal component analysis, and other statistical techniques may be employed to determine the influence of the different factors on the expected length of time to GR signal transition and deviations from the expected length of time. Bayesian statistics may be employed in calculating the expected values, conditioned by the other factors. Neural networks including deep learning, and other artificial intelligence ("AI," which term here and throughout this document includes statistical prediction, machine learning, neural networks, deep learning, reinforcement learning, factor analyses) systems, may also be employed, based on the experience of the same and/or other TCDs and their malfunction reporting; the other TCDs may be in similar locations (from, e.g., traffic flow, population density, zoning, and/or other perspectives). The variables/parameters input into the AI algorithms for learning may include population density near the TCDs, traffic flow in the vicinity of TCDs, distance from the TCDs to known/visible security cameras, distance from the TCDs to law enforcement bases (police/sheriff stations), and others.

The verification step may be performed in several ways, some or all which may be combined. This is the case with all features described throughout this document and the incorporated documents, which features may be present individually, in any combination, and in any permutation, unless the presence or absence of specific features is inherently required, explicitly indicated, or otherwise made clear from the description.

Figure 2:
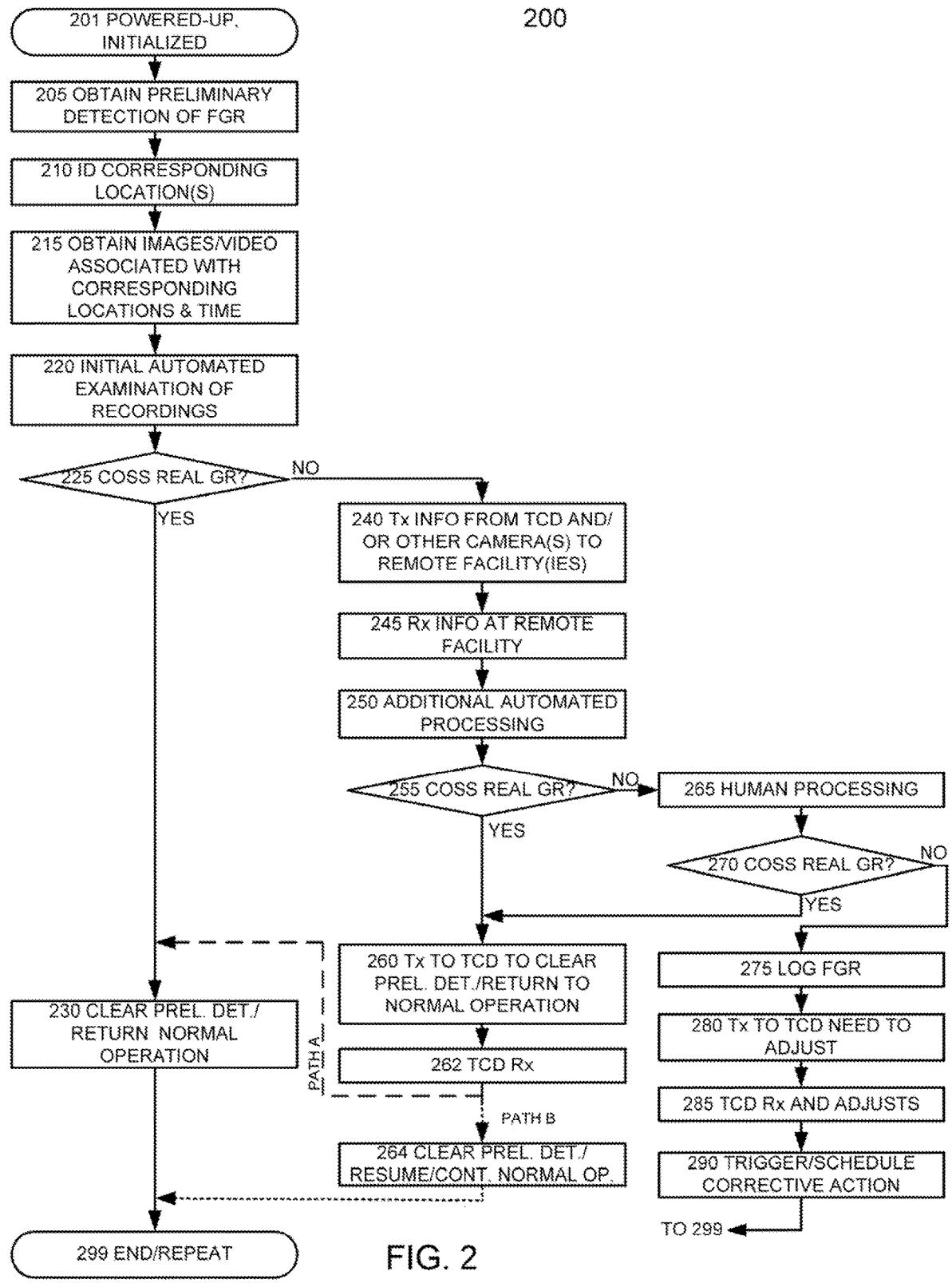
FIG. 2 illustrates selected steps/decision blocks of a process for identifying faults in traffic control devices and/or in sensors connected to the traffic control devices.
Figure 3:
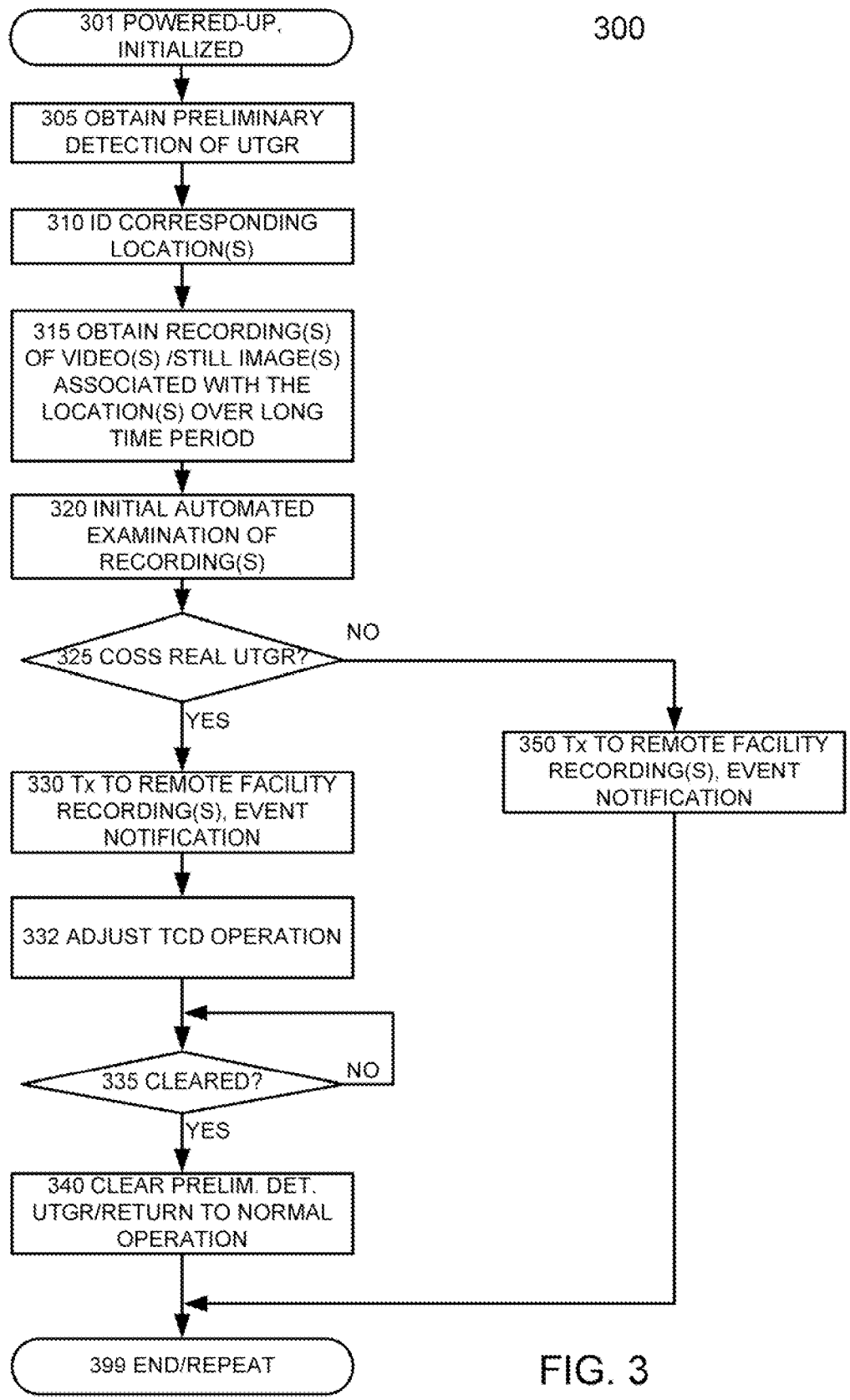
FIG. 3 illustrates selected steps/decision blocks of another process for identifying faults in traffic control devices and/or in sensors connected to the traffic control devices.
Figure 6:
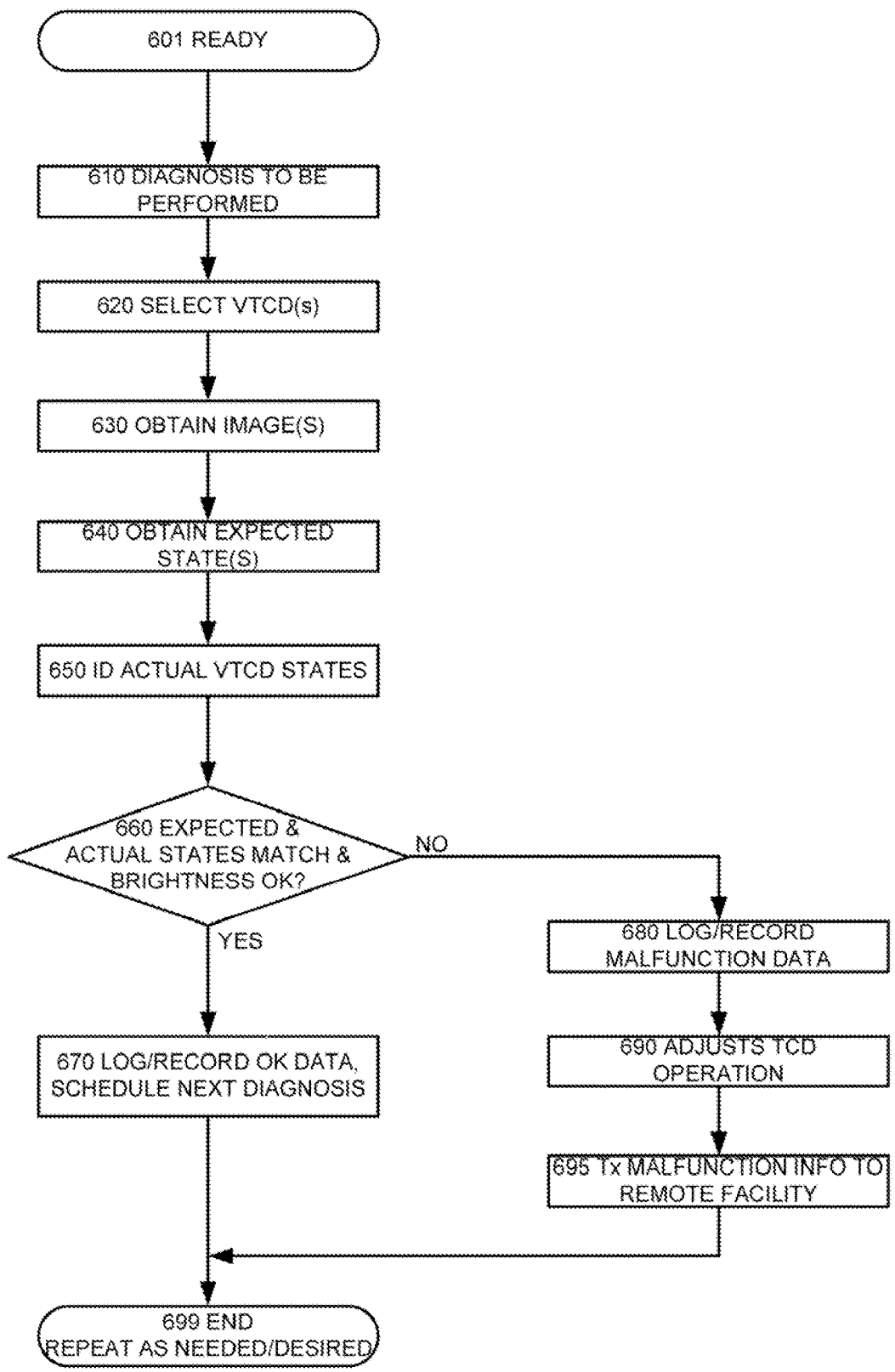
FIG. 6 illustrates selected steps/decision block of a process for identifying display-related faults in traffic control devices.
Figure 7:
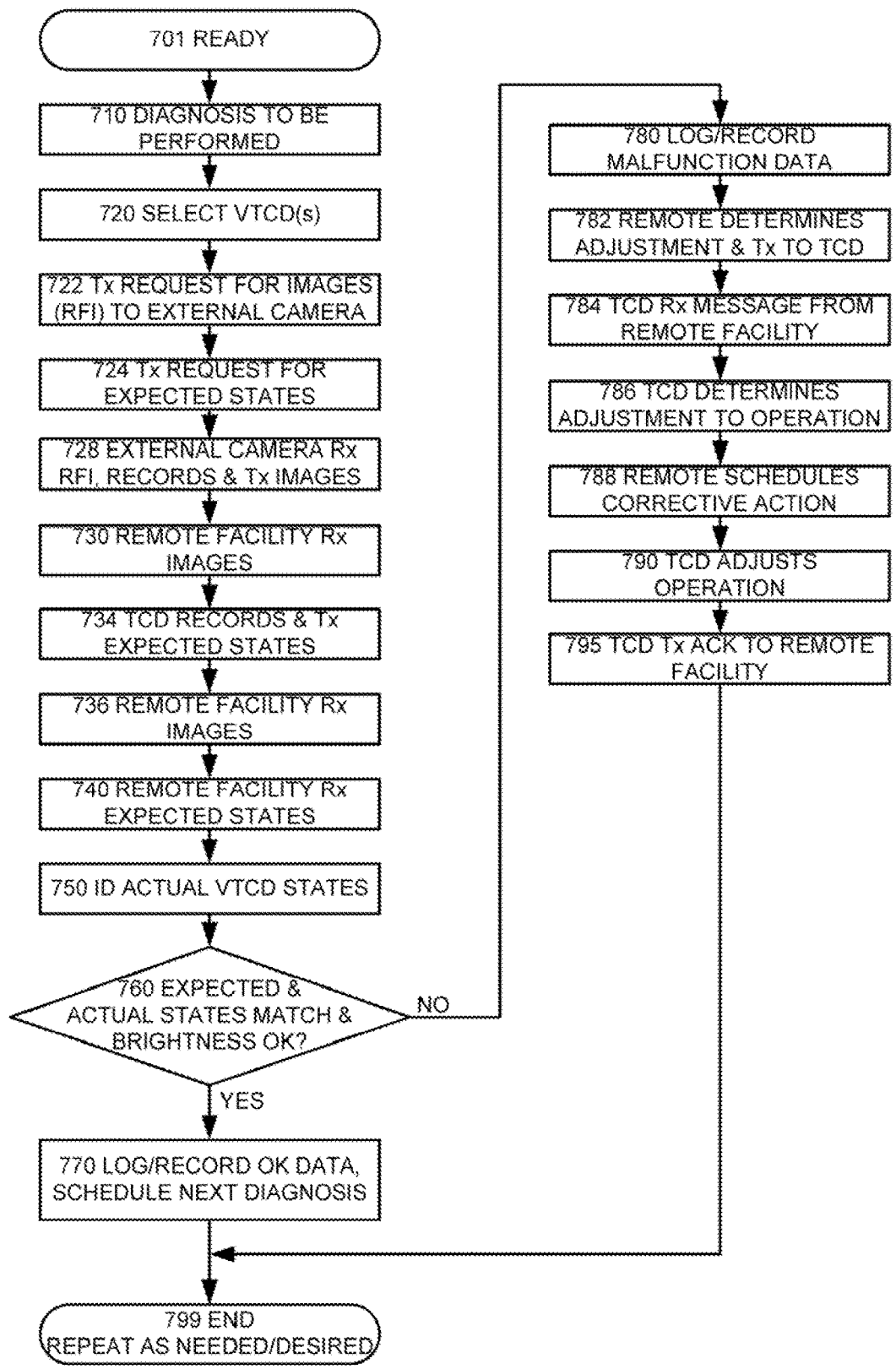
FIG. 7 illustrates selected steps/decision block of another process for identifying display-related faults in traffic control devices.
Figure 8:
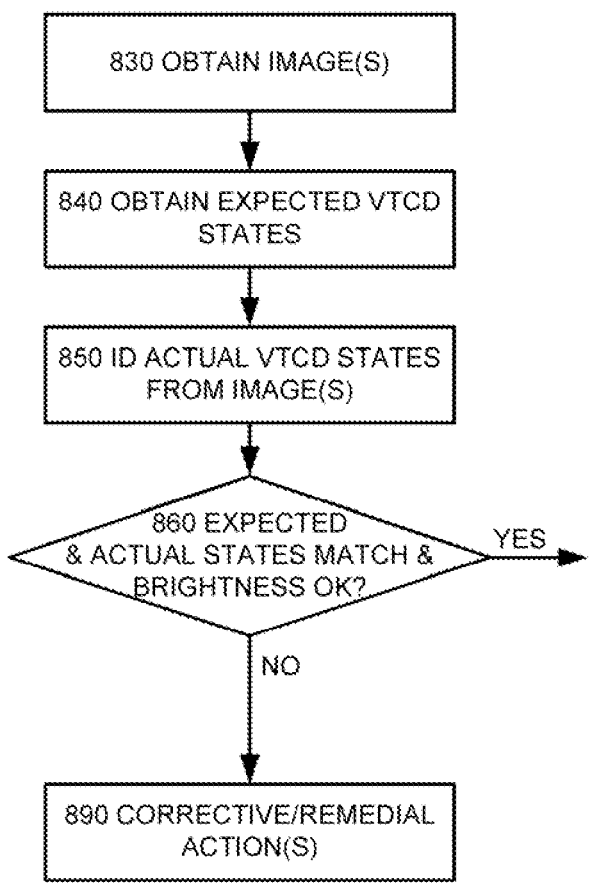
FIG. 8 illustrates selected steps/decision block of another process for identifying display related faults in traffic control devices.

FIG. 2 illustrates selected steps and decision blocks of a process 200 for obtaining a preliminary detection of an FGR, and verifying it. FIG. 3 illustrates selected steps and decision blocks of a process 300 for obtaining and processing/verifying a preliminary detection of a UTGR. FIG. 6 illustrates steps of a process 600 for diagnosing TCD display-related failures. FIG. 7 illustrates selected steps of a process 700 for diagnosing display-related failures, in which process many of the steps are performed by the remote facility. FIG. 8 illustrates selected states of a more generalized process 800 for diagnosing TCD display failures. These processes are described in one or more of the RELATED APPLICATIONS identified above and incorporated by reference.

The TCD 100 may be configured to perform as a beacon, as is described, for example, in the related patent applications (Ser. Nos. 16/112,743, 17/039,885, 17/061,576, and 62/596,891) incorporated by reference. A beacon that is not a traffic control device may also be implemented as is described in the related patent applications. A beacon may be a stand-alone device or it may be combined with some other functionality and may include components shown in FIG. 1, likely though not necessarily without the visual traffic control display(s) 135, the camera(s) 130, and/or the interface(s) 140. But beacon functionality in the TCD 100 and/or the non-TCD beacon may also be implemented in other ways. Methods of position location and distance measurement include transponder-based techniques, and other techniques. See, generally, David Munoz et al., Position Location Techniques and Applications (1st Edition, ISBN-13: 978-1402076770), which book is hereby incorporated by reference in its entirety. A beacon may include VANET functionality, for example, RSU functionality.

For beacon operation, the TCD 100 is configured to transmit (e.g., broadcast, multicast, or simply transmit to a particular device) through a transmitter 120B a beacon signal that carries information sufficient for an appropriately-configured receiver (such as a receiver of a vehicle computer, a smart phone or another communication/computing mobile device, a dedicated navigation device, a gaming device, smart glasses, or a similar device, generally designated as a "receiving device") to determine the distance from the receiving device to the TCD 100. This information, combined with the known geographic coordinates of the TCD 100, allows the vehicle receiver to determine its distance to the TCD 100 and its location, possibly with greater precision than would otherwise be possible. This is particularly useful in the presence of significant GPS multipath ("MP"), when GPS signals are blocked, when significant interference on the frequencies used by GPS is present, and when no GPS capability is available in the receiving device. But even when GPS works as designed, the distance measurement functionality may improve the location estimation capability of the receiving device. Note that the receiving device may employ the distance measurement ("DM") techniques describe herein to measure distances to two or more beacons, and derive its location/position information from the multiple distance measurements, e.g., using trilateration and/or "other location information" as defined elsewhere in this document. Ambiguities may be resolved using various other information items, including without limitation map information, dead reckoning, accelerometer information, triangulation, and trilateration.

Figure 4A:
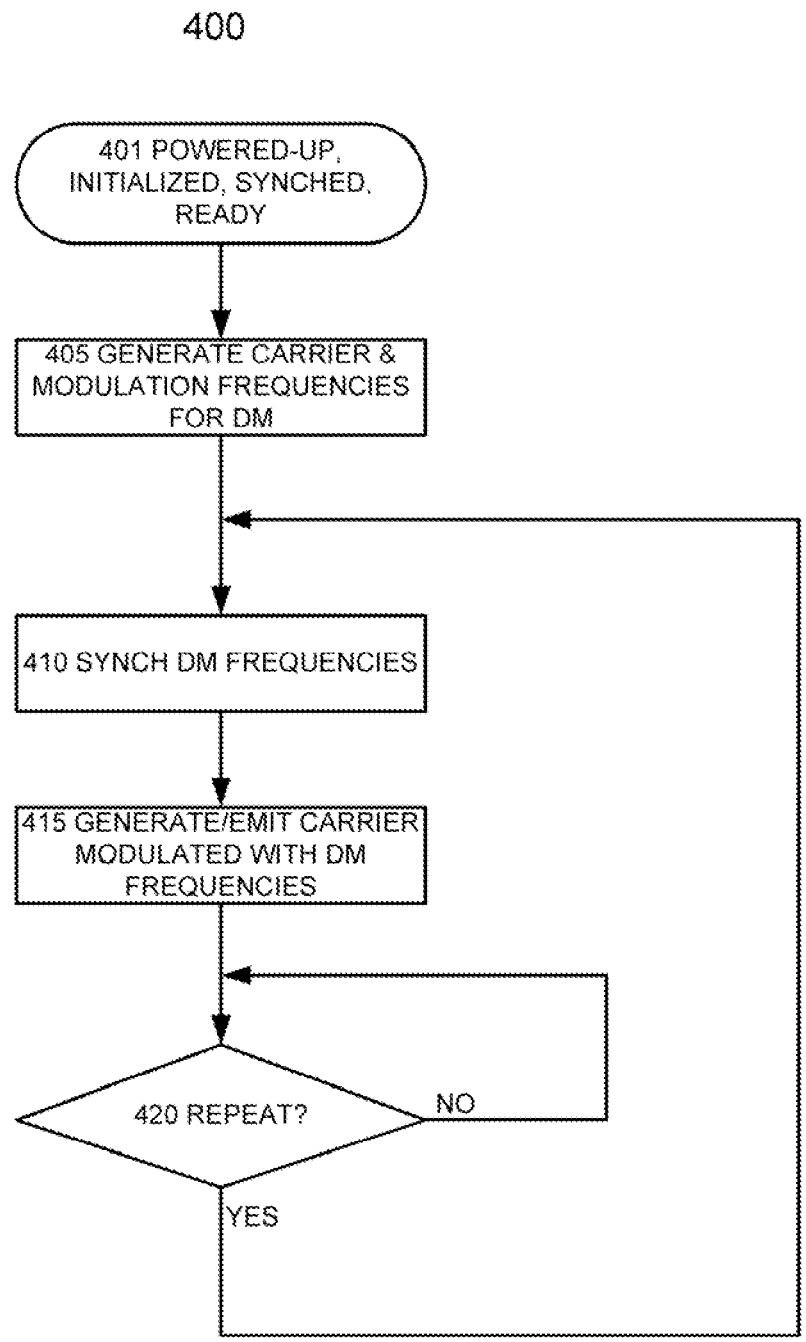
FIG. 4A illustrates selected steps/decision block of a process for transmitting signals that facilitate distance measurement.
Figure 4B:
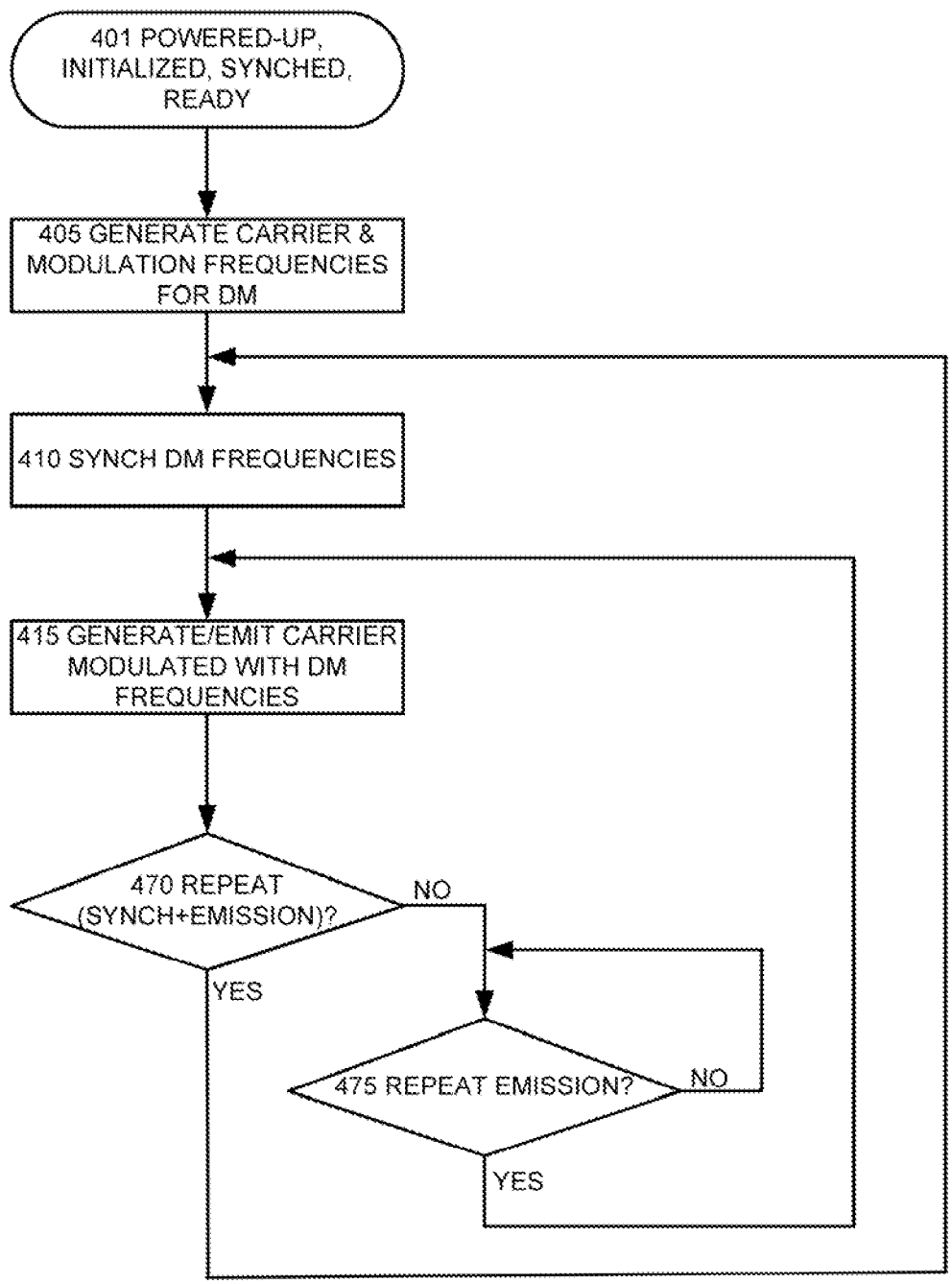
FIG. 4B illustrates selected steps/decision blocks of another process for transmitting signals that facilitate distance measurement.
Figure 5:
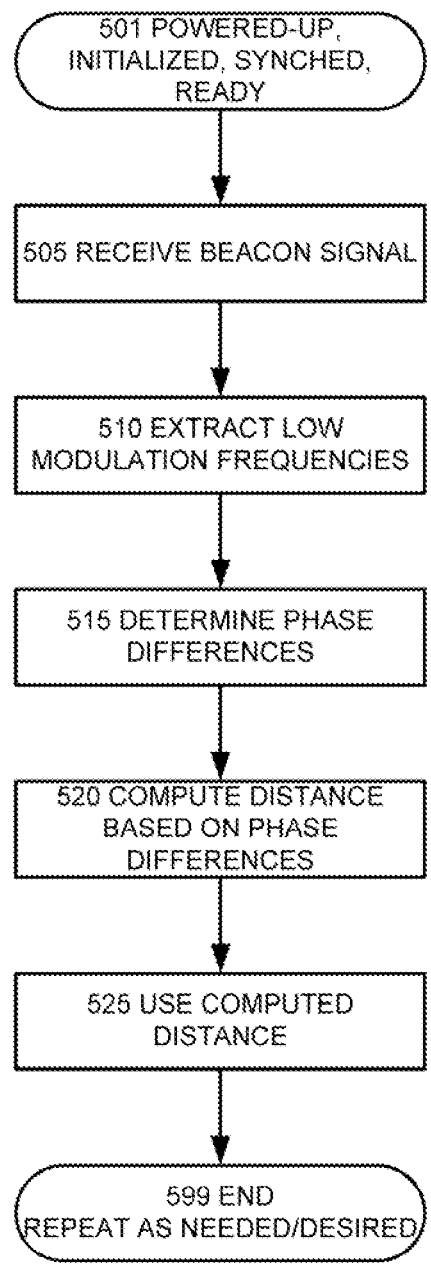
FIG. 5 illustrates selected steps of a process for receiving beacon signals and estimating distance between a receiving device and a beacon.

FIG. 4A and FIG. 4B illustrate selected steps and decision block of processes 400 and 450 for transmitting signals that facilitate distance measurement. The process 400 and the process 450 are described in one or more of the RELATED APPLICATIONS identified above and incorporated by reference herein. FIG. 5 illustrates selected steps of a process 500 for estimating distance between a receiving device and a beacon. The process 500 is also described in one or more of the RELATED APPLICATIONS identified above and incorporated by reference herein.

There are other techniques for measuring the vehicle-TCD 100 distance, including transponder-based techniques. See, generally, David Munoz et al., Position Location Techniques and Applications (1st Edition, ISBN-13: 978-1402076770), which book has been already mentioned and is incorporated by reference herein.

The TCD 100 may be configured to transmit (e.g., transmit to a particular device/vehicle, multicast to several particular devices/vehicles, broadcast, transmit otherwise) through a transmitter 120B information regarding its state, the expected change/transition in the state (timing and type of the expected state transition), and confidence level in the expected change/transition. The state information may include data specific to different cycles of the state machine of the TCD 100. A vehicle computer may receive (e.g., through a receiver/transceiver) the signal from the TCD 100 and determine whether or not the light in its direction of travel currently allows the vehicle to proceed, and when the light in its direction of travel will change its current state from allowing the vehicle to proceed (green) to not allowing the vehicle to proceed (red), or vice versa, from red to green. The TCD 100 may also update this information in real time, based on the passage of time and the various GRs that affect the state transitions of the TCD's state machine. The TCD 100 may transmit to the traffic in its vicinity confidence level regarding the states of interest and the timing of the state changes, and may also do so in real time. In this paragraph and below in the description, "real time" means within a time period that the moving traffic can use the information to its advantage (e.g., to shift discrete or continuous gears, accelerate/decelerate, start/stop engine, engage regenerative braking), typically within five seconds or, even better within two seconds; in embodiments, the time period is less than 200 milliseconds. Thus, the signal(s) from the TCD 100 may carry information regarding the current state (and possibly regarding anticipated change/transition and the level of confidence in the anticipated change/transition) in one or several (e.g., all) of the directions of travel through the intersection controlled by the TCD 100; the vehicle computer can thus use this received TCD state information to control the power train (for example, in self-driving cars and cars traveling with engaged cruise control or another driver-assistance device), including braking, regenerative braking, acceleration/deceleration, starting/stopping of the internal combustion engine (if present in the vehicle), selection of a gear in a multi-gear transmission or selection of a gear ratio in a continuously-variable transmission ("CVT"), selection of a particular electrical storage device for providing motive power or for receiving regenerated electrical power, engagement/disengagement of a clutch. In connection with the selection of the electrical power source, an inventive vehicle may have a supercapacitor power source in addition to a more conventional electrochemical rechargeable battery (e.g., Li-Ion battery). In controlling the power train, the vehicle computer can use the distance estimate(s) from the TCD or another beacon, in addition to the TCD state information and possibly other information.

Figure 9:
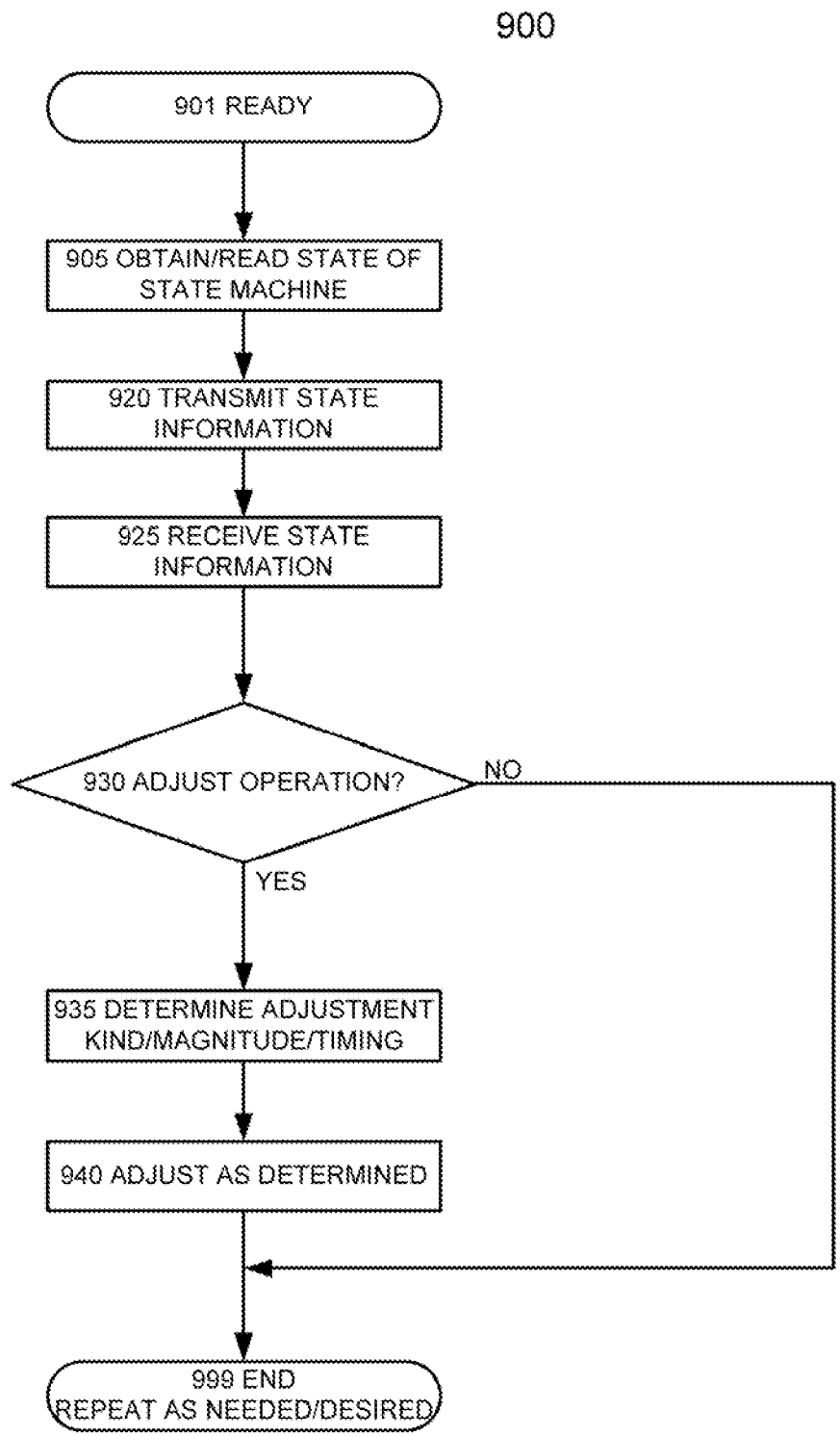
FIG. 9 illustrates selected steps/decision block of a process of transmitting and using information regarding current states of a traffic control device.

FIG. 9 illustrate selected steps and/or decision blocks of a process 900 of transmitting and using information regarding current state(s) of a traffic control device (TCD), such as a traffic signal.

At flow point 901, an apparatus is powered-up, initialized, and ready to perform the steps of the process. The apparatus may be the TCD, a system including the TCD, or another device/system. For convenience, the description of the process 900 refers to "TCD" but this should be understood without loss of generality (as is the case with other processes in this document including process 1000 described below).

In step 905, the TCD obtains the state of its state machine, which may include the state(s) of the VTCD(s) of the TCD and/or the state(s) of the device(s) driving the VTCD(s). (These may differ when, for example, there is a fault in the VTCD(s) or the circuitry driving the VTCD(s).)

In step 920, the TCD transmits (sends one or a plurality of transmissions of) information that includes the state of the state machine. The transmitting may include broadcasting, multicasting, transmitting to a particular device, e.g., to a vehicle in whose a path a particular VCTD is located and facing the approaching vehicle. The transmitting may include omnidirectional transmissions; substantially omnidirectional transmissions; horizontally-omnidirectional transmissions; substantially horizontally-omnidirectional transmissions; directional transmissions, including directional in three dimensions and/or directional in the horizontal plane (transmitting in a predetermined or adjustable azimuthal/compass direction over a range of altitude/elevation angles). The transmitting may be through antennae that are steerable electronically (e.g., a phased array) and/or mechanically in three dimensions and/or in the horizontal plane. The transmitting may be on different frequencies and using different communication schemes (e.g., modulation, protocols). In the case of directional and/or steerable transmissions, the transmissions may be pointed in the direction of the traffic approaching the TCD along one or more roadways toward the TCD. Some transmissions may be directionally aimed towards oncoming traffic and include all or part of the information, e.g., the part that describes the state of the VTCD facing (and possibly controlling) the potentially approaching traffic from that direction; the part of information relating the VTCD(s) facing the potentially approaching traffic from other directions may be omitted from those transmissions; thus, transmissions in different directions may carry different state information. The transmitting may be or include dedicated short-range communications ("DSRC") transmission, cellular transmissions, WiFi transmissions, VANET transmissions, and other types of transmission. The TCD may send the information to a third device, such as a remote system, which remote device (e.g., a computing system such as a server with communication capability) may then forward the information (directly or indirectly) to the vehicle, for example, through a cellular system. Although mostly RF transmissions are mentioned in this document, in examples, infrared, ultrasound, and other types of carrier medium may be used.

In step 925, a vehicle receives the state information of the TCD (whether transmitted directly or indirectly).

In decision block 930, the vehicle determines whether to adjust (perform an adjustment of) the operation of its power train in response to the state information. The decision may be based on the goals of achieving, and may actually result in, better fuel/energy efficiency, shortening trip time, improving passenger/driver comfort (e.g., avoiding/reducing acceleration and/or deceleration, particularly peak acceleration/deceleration), reducing vehicle wear and tear (e.g., wear and tear on engine/motor, transmission, battery, brakes), improving the flow of the surrounding traffic, increasing safety, and possibly other goals. This will be illustrated in the example sets set forth below.

The adjustment of power train operation may include engagement/disengagement of the vehicle's braking system; engagement/disengagement of the vehicle's regenerative braking system; application of power for acceleration; increasing/decreasing power of the vehicle's engine/motor; disengagement of motor and/or engine for coasting through operation of a clutch or otherwise; starting/stopping of the internal combustion engine (if present in the vehicle); selection of a gear in a multi-gear transmission or selection of a gear ratio in a continuously-variable transmission; selection of a particular electrical storage device for providing motive (or other) power or for receiving regenerated electrical power; engagement/disengagement of a compressor of the vehicle's climate control system. Note that the concept of adjustment of the operation of the power train here may differ from a narrower understanding of power train that might not encompass certain aspects such as engagement/disengagement of a braking system and of an air conditioning compressor.

If no adjustment is determined in the decision block 930, the process may terminate at flow point 999, and may be repeated as needed or desired.

If an adjustment is to be effected, the process proceeds towards step 935, where the vehicle determines the kind and/or magnitude of the adjustment, and performs the adjustment in step 940. The vehicle may also determine (in the step 935) to schedule the adjustment for a somewhat later time and/or place (e.g., on the way to the TCD), and then perform the adjustment (in the step 940) when the time/place is reached; the later adjustment may be contingent on various parameters, including receipt or non-receipt by the vehicle of new/updated information from the TCD.

The decision block 930 and the step 935 may be combined.

The process flow may then terminate in the flow point 999, and may be repeated as needed or desired.

Figure 10:
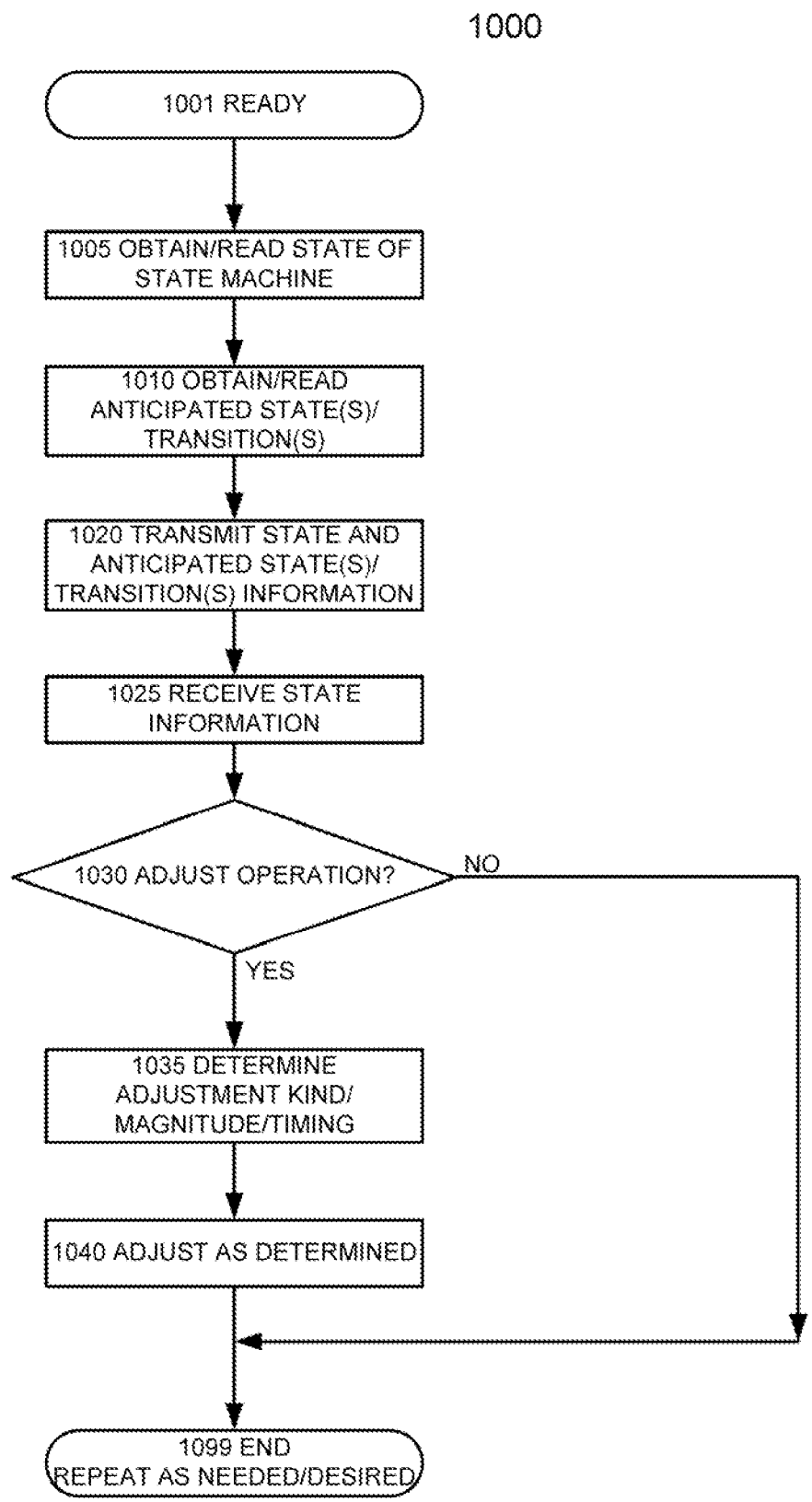
FIG. 10 illustrates selected steps/decision block of a process of transmitting and using information regarding current and anticipated states of a traffic control device.

FIG. 10 illustrate selected steps and/or decision block(s) of the process 1000 of transmitting and using information regarding current and anticipated state(s) of a traffic control device (TCD), such as a traffic signal. This process is similar to the process 900, with the inclusion of transmission and use of the anticipated state(s) of the TCD and, possibly, also of the timing and confidence level in the anticipated steps.

At flow point 1001, an apparatus is powered-up, initialized, and ready to perform the steps of the process. The apparatus may be the TCD, a system including the TCD, or another device/system.

In step 1005, the TCD obtains the state of its state machine, which may include the state(s) of the VTCD(s) of the TCD and/or the state(s) of the device(s) driving the VTCD(s). (These may differ when, for example, there is a fault in the VTCD(s) or the circuitry driving the VTCD(s).)

In step 1010, the TCD obtains the anticipated states and state transition(s) of its state machine, which may include the state(s) of the VTCD(s) of the TCD. The anticipated state(s)/transition(s) included are those that may affect a vehicle that is approaching the TCD and may be affected by the state change(s) in the TCD. Typically, the time of anticipated state transitions will be less than 1 minute. For example, an anticipated state transition resulting from a green to a red display on a VTCD within a time period (e.g., one minute) that may affect an approaching vehicle or a vehicle awaiting at the TCD may be included; as another example, an anticipated state transition resulting from a red to a green display on a VTCD within a time period (e.g., one minute) that may affect an approaching vehicle or a vehicle awaiting at the TCD may be included.

In step 1020, the TCD transmits (sends one or a plurality of transmissions of) information that includes the state(s) of the state machine and the anticipated state(s)/transition(s), and possibly also the likelihood or an indication of confidence level in the transition(s) and its/their timing. The transmitting may include broadcasting, multicasting, transmitting to a particular device, e.g., to a vehicle in whose a path a particular VCTD is located and facing the approaching vehicle. The transmitting may include omnidirectional transmissions; substantially omnidirectional transmissions; horizontally-omnidirectional transmissions; substantially horizontally-omnidirectional transmissions; directional transmissions, including directional in three dimensions and/or directional in the horizontal plane (transmitting in a predetermined or adjustable azimuthal/compass direction over a range of altitude/elevation angles). The transmitting may be through antenna(e) steerable electronically (e.g., a phased array) and/or mechanically in three dimensions and/or in the horizontal plane. The transmitting may be on different frequencies and using different communication schemes (e.g., modulation, protocols). In the case of directional and/or steerable transmissions, the transmissions may be pointed in the direction of the traffic approaching the TCD along one or more roadways toward the TCD. Some transmissions may be directionally aimed towards oncoming traffic and include all or part of the information, e.g., the part that describes the state of the VTCD facing (and possibly controlling) the potentially approaching traffic from that direction; the part of information relating the VTCD(s) facing the potentially approaching traffic from other directions may be omitted from those transmissions; thus, transmissions in different directions may carry different state information. The transmitting may be or include dedicated short-range communications ("DSRC") transmission, cellular transmissions, WiFi transmissions, VANET transmissions, and other types of transmission. The TCD may send the information to a third device, such as a remote system, which remote device (e.g., a computing system such as a server with communication capability) may then forward the information (directly or indirectly) to the vehicle(s), for example, through a cellular system. Although mostly RF transmissions are mentioned in this document, in examples, infrared, ultrasound, and other types of carrier medium may be used.

In step 1025, a vehicle receives the state information of the TCD and the anticipated state(s)/transition(s), and possibly also the likelihood or an indication of confidence level in the transition(s) and its/their timing (whether transmitted directly or indirectly).

In decision block 1030, the vehicle determines whether to adjust (perform an adjustment of) the operation of its power train in response to the state information. The decision may be based on the goals of achieving, and may actually result in, better fuel/energy efficiency, shortening trip time, improving passenger/driver comfort (e.g., avoiding/reducing acceleration and/or deceleration, particularly peak acceleration/deceleration), reducing vehicle wear and tear (e.g., wear and tear on engine/motor, transmission, battery, brakes), improving the flow of the surrounding traffic, increasing safety, and possibly other goals. This will be illustrated in the example sets set forth below.

The adjustment of power train operation may include engagement/disengagement of the vehicle's braking system; engagement/disengagement of the vehicle's regenerative braking system; application of power for acceleration; increasing/decreasing power of the vehicle's engine/motor; disengagement of motor and/or engine for coasting through operation of a clutch or otherwise; starting/stopping of the internal combustion engine (if present in the vehicle); selection of a gear in a multi-gear transmission or selection of a gear ratio in a continuously-variable transmission; selection of a particular electrical storage device for providing motive (or other) power or for receiving regenerated electrical power; engagement/disengagement of a compressor of the vehicle's climate control system. Note that the concept of adjustment of the operation of the power train here may differ from a narrower understanding of power train that might not encompass certain aspects such as engagement/disengagement of a braking system and of an air conditioning compressor.

If no adjustment is determined in the decision block 1030, the process may terminate at flow point 1099, and may be repeated as needed or desired.

If an adjustment is to be effected, the process proceeds towards step 1035, where the vehicle determines the kind and/or magnitude of the adjustment, and performs the adjustment in step 1040. The vehicle may also determine (in the step 1035) to schedule the adjustment for a somewhat later time and/or place (e.g., on the way to the TCD), and then perform the adjustment (in the step 1040) when the time/place is reached; the later adjustment may be contingent on various parameters, including receipt or non-receipt by the vehicle of new/updated information from the TCD.

The decision block 1030 and the step 1035 may be combined.

A few sets of examples will illustrate to the decision blocks 930/1030 and the steps 935/1035. As a person of ordinary skill in the art would readily understand after perusal of this document and the incorporated documents, the vehicles in described include computer(s) controlling/adjusting power train functions, so that the actions ascribed to a vehicle may be controlled and implemented by the vehicle's computer acting on other components of the vehicle, such as engines, motors, batteries, regenerative and conventional braking systems, compressors, etc.

Example Set A

A vehicle is approaching an intersection with a TCD; the VTCD (of the TCD) facing the vehicle is red. The vehicle may be a self-driving vehicle or a non-SDV traveling with an engaged cruise control, for example. (As usual in this document, "may" and "may be" are permissive terms.) The TCD transmits information that includes the current state of the VTCD (red) and the vehicle receives it. The vehicle determines to make a change/adjustment in the operation of its power train (with the expanded explanation of adjustment of the operation of the power train already mentioned, which is applicable throughout the description and the claims) in response to the red VTCD; the adjustment may include turning the ICE off to let the vehicle coast to the TCD; decreasing the power of the ICE or of an electric motor powering the vehicle, or turning on regenerative braking to slow the vehicle down gradually and possibly recover some of the vehicle's kinetic energy; engaging an air conditioning compressor of the vehicle's climate control system to make use of the vehicle's kinetic energy; shifting transmission of the vehicle to a different gear or changing the ratio of a CVT of the vehicle; or any consistent combination of these and possibly other adjustments to the power train operation. The adjustment in the power train operation may be performed consistent with safety provisions of the power train control algorithm of an SDV. The adjustment in the power train operation may be performed when the VTCD is not visible to the vehicle, as in the cases of visual obstruction, a bend in the road from the vehicle to the TCD, and an intervening hill/knoll between the vehicle and the TCD.

Here and throughout this document, the determination of whether to make the change to the power train operation, and which change to make, may depend not only on the receipt of information that includes the current state of the VTCD, but also on other factors, such as the distance to the TCD (and more generally the location of the vehicle), relative elevation(s) of the vehicle and the intersection controlled by the TCD and points on the roadway between them, state of the vehicle's battery charge, distance to the destination/charging station, traffic conditions (including the traffic ahead of the vehicle and travelling towards the intersection), a mode of energy conservation under which the vehicle is operating (e.g., fuel/energy saving, sport/performance, normal) and other current driver preferences (e.g., comfort level), time/date (e.g., time of day, day of the week, holiday/non-holiday), local events at the current time, and other factors, both internal to the vehicle and external. The identity of the driver (e.g., for selection of driver preferences) may be determined in various ways, including through facial recognition, identification of the particular key or similar vehicle activation device used to start and/or operate the vehicle, identification of a mobile device (e.g., smartphone, tablet) in the vehicle, an implant of a person in the vehicle, latest driver selection, and others.

Example Set B

A vehicle is approaching an intersection with a TCD; the VTCD (of the TCD) facing the vehicle is green. The vehicle may be a self-driving vehicle or a non-SDV vehicle traveling with an engaged cruise control, for example. The TCD transmits information that includes the current state of the VTCD (green) and an anticipated state change to red within a short period of time; the period of time may be, for example, less than two minutes, less than one minute, less than 30 seconds, less than 15 seconds. The vehicle receives the information. The vehicle determines to make an adjustment in the operation of its power train in response to either the green VTCD or the anticipated change to red within the short period of time or the within the period of time that the vehicle estimates would be needed to reach the TCD under current conditions (e.g., traveling speed, speed limit, traffic conditions). The adjustment may include turning the ICE off or on and let the vehicle coast to the TCD or accelerate towards the TCD; increasing or decreasing the power of the ICE or of an electric motor powering the vehicle or turn off or on regenerative braking to slow the vehicle down gradually and possibly recover some of the vehicle's kinetic energy, or facilitate accelerating or maintaining the current vehicle speed; engaging or disengaging an air conditioning compressor of the vehicle's climate control system; shifting transmission of the vehicle to a different gear or changing the ratio of a CVT of the vehicle; or any consistent combination of these and possibly other adjustments to the power train operation. The adjustment in the power train operation may be performed consistent with safety provisions of the power train control algorithm of an SDV. The adjustment in the power train operation may be performed when the VTCD is not visible to the vehicle, as in the cases of visual obstruction or a bend in the road from the vehicle to the TCD or an intervening hill/knoll between the vehicle and the TCD.

Example Set C

A vehicle is approaching an intersection with a TCD; the VTCD facing the vehicle is red. The vehicle may be a self-driving vehicle or a non-SDV traveling with an engaged cruise control, for example. The TCD transmits information that includes the current state of the VTCD (red) and an anticipated state change to green within a short period of time; the period of time may be, for example, less than two minutes, less than one minute, less than 30 seconds, less than 15 seconds. The vehicle receives the information. The vehicle determines to make aa adjustment in the operation of its power train in response to either the red VTCD or the anticipated change to green within the short period of time or the within the period of time that the vehicle estimates it would take to reach the TCD under current conditions (e.g., traveling speed and changes to the speed of the vehicle such as might occur during coasting/acceleration/deceleration, speed limit, traffic conditions). The adjustment may include turning the ICE off or on and let the vehicle coast to the TCD or accelerate towards the TCD; increasing or decreasing the power of the ICE or of an electric motor powering the vehicle or turn off or on regenerative braking; engaging or disengaging an air conditioning compressor of the vehicle's climate control system; shifting transmission of the vehicle to a different gear or changing the ratio of a CVT of the vehicle; or any consistent combination of these and possibly other changes to the power train operation. The adjustment in the power train operation may be performed consistent with safety provisions of the power train control algorithm of an SDV. The adjustment in the power train operation may be performed when the VTCD is not visible to the vehicle, as in the cases of visual obstruction or a bend in the road from the vehicle to the TCD or an intervening hill/knoll between the vehicle and the TCD.

In controlling/adjusting the power train, the vehicle computer may use the distance estimate(s) from the TCD or another beacon, in addition to the TCD state information, anticipated changes, and confidence levels.

The communications between the TCD 100 and a remote facility/resource may be effected through the receivers 120A/transmitters 120B, through separate connections that are not shown in FIG. 1, including, for example, landline connections, cellular connections, WiFi connections to stationary hotspots, VANET network connections, dedicated short-range communications ("DSRC") connections, and combinations of these and/or other types of connections. In embodiments, the communications employ intermediate connections through vehicle computers in the vehicles and/or smartphones and other mobile devices of people (pedestrians/drivers/passengers) passing in the vicinity of the TCD, such as through the intersection controlled by the TCD. The TCD may transmit packets to such devices, with instructions to send the packets to the remote facility/resource. The vehicles and/or mobile devices can then use their own connections (e.g., cellular connections to the Internet) to send the packets to the remote facility/resource; if no current connection is available, a vehicle/smartphone or other similar devices with communication/processing capabilities may store the packets and transmit them to the remote facility at a later time, when a connection becomes available. The packets may be encrypted. The TCD may break up its communications into several/many packets, so that individual packets may be sent to the vehicle computers/smartphone during a short time while the vehicle computers/smartphones are in such vicinity of the TCD that reliable communications can be maintained therebetween. The remote facility/resource can transmit its communications back to the TCD in a similar manner, for example, using the vehicles from which it received the TCD packets (because such vehicles are likely to travel in the vicinity of the TCD 100) or other vehicles. The information between the TCD and the remote facility/resource may be transmitted redundantly to increase the probability of valid/uncorrupted receipt at the destination.

The features described throughout this document and all the incorporated documents may be present individually, or in any combination or permutation, except where the presence or absence of specific features (elements/steps/limitations) is inherently required, explicitly indicated, or otherwise made clear from the description. This applies whether or not features appear related to specific embodiments; thus, features of the different described embodiments may be combined.

Although the process steps and decisions (if decision blocks are present) may be described serially in this document, certain steps and/or decisions may be performed by same and/or separate elements in conjunction or in parallel, asynchronously or synchronously, in a pipelined manner, or otherwise. There is no particular requirement that the steps and decisions be performed in the same order in which this description lists them or the Figures show them, except where a specific order is inherently required, explicitly indicated, or is otherwise made clear from the context. Furthermore, not every illustrated step and decision block may be required in every embodiment in accordance with the concepts described in this document, while some steps and decision blocks that have not been specifically illustrated may be desirable or necessary for proper operation in some embodiments in accordance with the concepts. It should be noted, however, that specific embodiments/variants/implementations/examples use the particular order(s) in which the steps and decisions (if applicable) are shown and/or described.

The instructions (machine executable code) corresponding to the method steps of the embodiments, variants, implementations, and examples disclosed in this document may be embodied directly in hardware, in software, in firmware, or in combinations thereof. A software/firmware module may be stored in volatile memory, flash memory, Read Only Memory (ROM), Electrically Programmable ROM (EPROM), Electrically Erasable Programmable ROM (EEPROM), hard disk, a CD-ROM, a DVD-ROM, or other forms of non-transitory storage medium known in the art. Exemplary storage medium or media may be coupled to one or more processors so that the one or more processors can read information from, and write information to, the storage medium or media. In an alternative, the storage medium or media may be integral with one or more processors.

This document describes in detail the inventive apparatus, methods, and articles of manufacture for operating TCDs/beacons, vehicle computers, smart phones, and related technologies. This was done for illustration purposes and, therefore, the foregoing description is not necessarily intended to limit the spirit and scope of the invention(s) described. Neither the specific embodiments of the invention(s) as a whole, nor those of its (or their, as the case may be) features necessarily limit the general principles underlying the invention(s). The specific features described herein may be used in some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features may be employed in the absence of use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

I claim:

1. A method of adjusting operation of a power train of a vehicle, comprising steps of:
   receiving information describing current state of a traffic control device (TCD), by a vehicle computer of the vehicle; and
   adjusting the operation of the power train of the vehicle in response to the current state of the TCD, by the vehicle computer, wherein the step of adjusting comprises changing state of an air conditioning (AC) compressor of a climate control system of the vehicle.

2. The method of claim 1, wherein the step of changing state comprises:
   engaging the AC compressor of the climate control system of the vehicle to improve energy efficiency of the vehicle.

3. The method of claim 1, wherein the step of changing state comprises:
   disengaging the AC compressor of the climate control system of the vehicle to improve energy efficiency of the vehicle.

4. The method of claim 1, wherein the step of adjusting further comprises:
   varying ratio of a transmission of the vehicle.

5. The method of claim 1, wherein the step of adjusting further comprises:
   engaging a regenerative braking system of the vehicle.

6. The method of claim 1, wherein the step of adjusting further comprises:
   disengaging a regenerative braking system of the vehicle.

7. The method of claim 1, wherein the step of adjusting further comprises:
   increasing or decreasing power of a motor or an engine of the vehicle.

8. The method of claim 1, wherein the step of adjusting further comprises:
   turning on or off an internal combustion engine (ICE) of the vehicle.

9. The method of claim 1, wherein the step of adjusting further comprises:
   engaging or disengaging a braking system of the vehicle.

10. A method of adjusting operation of a power train of a vehicle, comprising steps of:

receiving information describing current state of a traffic control device (TCD) and an anticipated state transition of the TCD, by a vehicle computer of the vehicle; and adjusting the operation of the power train of the vehicle in response to the information, by the vehicle computer, wherein the step of adjusting comprises changing state of an air conditioning (AC) compressor of a climate control system of the vehicle.

11. The method of claim 10, wherein the step of changing state comprises:

engaging the AC compressor of the climate control system of the vehicle.

12. The method of claim 10, further comprising:

receiving information containing likelihood of the anticipated state transition of the TCD, by a vehicle computer of the vehicle.

13. The method of claim 10, wherein the step of adjusting comprises:

disengaging the AC compressor of the climate control system of the vehicle to improve energy efficiency of the vehicle.

14. The method of claim 10, wherein the step of adjusting further comprises:

varying ratio of a transmission of the vehicle.

15. The method of claim 10, wherein the step of adjusting further comprises:

engaging a regenerative braking system of the vehicle.

16. The method of claim 10, wherein the step of adjusting further comprises:

disengaging a regenerative braking system of the vehicle.

17. The method of claim 10, wherein the step of adjusting further comprises:

increasing or decreasing power of a motor or an engine of the vehicle.

18. The method of claim 10, wherein the step of adjusting further comprises:

turning on or off an internal combustion engine (ICE) of the vehicle.

19. The method of claim 10, wherein the step of adjusting further comprises:

engaging or disengaging a braking system of the vehicle.

20. A vehicle computer installed in a vehicle, the vehicle computer comprising a receiver, the vehicle computer being configured to:

receive information describing current state of a traffic control device (TCD); and changing state of engagement of an air conditioning (AC) compressor of a climate control system of the vehicle, in response to the current state of the TCD.

* * * * *